United States Patent
Zhu et al.

(10) Patent No.: US 12,058,073 B2
(45) Date of Patent: Aug. 6, 2024

(54) METHOD AND APPARATUS FOR CSI RESOURCE CONFIGURATION IN A WIRELESS COMMUNICATIONS SYSTEM

(71) Applicant: Samsung Electronics Co., Ltd., Suwon-si (KR)

(72) Inventors: Dalin Zhu, Richardson, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 17/660,596

(22) Filed: Apr. 25, 2022

(65) Prior Publication Data

US 2022/0353040 A1    Nov. 3, 2022

Related U.S. Application Data

(60) Provisional application No. 63/183,302, filed on May 3, 2021.

(51) Int. Cl.
*H04L 5/00* (2006.01)

(52) U.S. Cl.
CPC .......... *H04L 5/0051* (2013.01); *H04L 5/006* (2013.01)

(58) Field of Classification Search
CPC .... H04B 7/0639; H04B 7/0695; H04B 7/088; H04L 5/0023; H04L 5/005; H04L 5/0051; H04L 5/006; H04L 5/0094
See application file for complete search history.

(56) References Cited

U.S. PATENT DOCUMENTS

| | | |
|---|---|---|
| 2020/0067590 A1 | 2/2020 | Wang et al. |
| 2021/0105725 A1 | 4/2021 | Karjalainen et al. |
| 2021/0111818 A1 | 4/2021 | Zhu |
| 2023/0189270 A1* | 6/2023 | Matsumura ........ H04B 7/06952 370/329 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.

(Continued)

*Primary Examiner* — Nader Bolourchi

(57) ABSTRACT

Methods and apparatuses for channel state information (CSI) resource configuration in a wireless communication system. A method for operating a user equipment includes receiving a first and second configurations for a first and second sets of reference signal (RS) resources, respectively, configured in a CSI resource setting, receiving a first set of RSs through the first set of RS resources, and receiving a second set of RSs through the second set of RS resources. The method further includes measuring at least one RS in the first or second sets of RSs, determining, based on the measured at least one RS, one or more resource indicators or one or more beam metrics, determining, based on the first or second configurations, a first CSI report or a second CSI report; and transmitting, in the first or second CSI reports, the one or more resource indicators or the one or more beam metrics.

20 Claims, 10 Drawing Sheets

(56) References Cited

OTHER PUBLICATIONS

"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued Aug. 10, 2022 regarding International Application No. PCT/KR2022/006345, 8 pages.
Ericsson, 'On beam management enhancements for simultaneous multi-TRP transmission with multi-panel reception', 3GPP TSG-RAN WG1 Meeting #104bis-e, R1-2103545, Apr. 2021, 8 pages.
Apple Inc., 'On Multi-TRP Beam Management Enhancement', 3GPP TSG-RAN WG1 Meeting #103-e, R1-2101353, Jan. 2021, 7 pages.

* cited by examiner

METHOD AND APPARATUS FOR CSI RESOURCE CONFIGURATION IN A WIRELESS COMMUNICATIONS SYSTEM

CROSS-REFERENCE TO RELATED APPLICATIONS AND CLAIM OF PRIORITY

The present application claims priority to U.S. Provisional Patent Application No. 63/183,302, filed on May 3, 2021. The content of the above-identified patent documents are incorporated herein by reference.

TECHNICAL FIELD

The present disclosure relates generally to wireless communication systems and, more specifically, the present disclosure relates to a channel state information (CSI) resource configuration in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a CSI resource configuration in a wireless communication system.

In one embodiment, a user equipment (UE) is provided. The UE includes a transceiver configured to receive a first configuration for a first set of reference signal (RS) resources configured in a CSI resource setting, receive a second configuration for a second set of RS resources configured in the CSI resource setting, receive a first set of RSs through the first set of RS resources, and receive a second set of RSs through the second set of RS resources. The UE further includes a processor operably coupled to the transceiver. The processor is configured to measure at least one RS in the first or second sets of RSs; determine, based on the measured at least one RS, one or more resource indicators or one or more beam metrics; and determine, based on the first or second configurations, a first CSI report or a second CSI report. The transceiver is further configured to transmit, in the first or second CSI reports, the one or more resource indicators or the one or more beam metrics. The first or second sets of RSs include synchronization signal blocks (SSBs) or non-zero power CSI-RSs (NZP CSI-RSs). The one or more resource indicators include SSB resource indicators (SSBRIs) or CSI-RS resource indicators (CRIs). The one or more beam metrics include layer 1 RS received powers (L1-RSRPs) or layer 1 signal to interference plus noise ratios (L1-SINRs).

In another embodiment, a base station (BS) is provided. The BS includes a transceiver configured to transmit a first configuration for a first set of RS resources configured in a CSI resource setting, transmit a second configuration for a second set of RS resources configured in the CSI resource setting, transmit a first set of RSs through the first set of RS resources, transmit a second set of RSs through the second set of RS resources, and receive, in a first CSI report or a second CSI report, one or more resource indicators or the one or more beam metrics corresponding to at least one RS in the first or second sets of RSs based on the first or second configurations. The first or second sets of RSs include SSBs or NZP CSI-RSs. The one or more resource indicators include SSBRIs or CRIs. The one or more beam metrics include L1-RSRPs or L1-SINRs.

In yet another embodiment, a method for operating a user equipment is provided. The method includes receiving a first configuration for a first set of RS resources configured in a CSI resource setting, receiving a second configuration for a second set of RS resources configured in the CSI resource setting, receiving a first set of RSs through the first set of RS resources, and receiving a second set of RS s through the second set of RS resources. The method further includes measuring at least one RS in the first or second sets of RSs, determining, based on the measured at least one RS, one or more resource indicators or one or more beam metrics, determining, based on the first or second configurations, a first CSI report or a second CSI report; and transmitting, in the first or second CSI reports, the one or more resource indicators or the one or more beam metrics. The first or second sets of RSs include SSBs or NZP CSI-RSs. The one or more resource indicators include SSBRIs or CRIs. The one or more beam metrics include L1-RSRPs or L1-SINRs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.1, "NR; Radio Resource Control (RRC) Protocol Specification."

Figure 1:
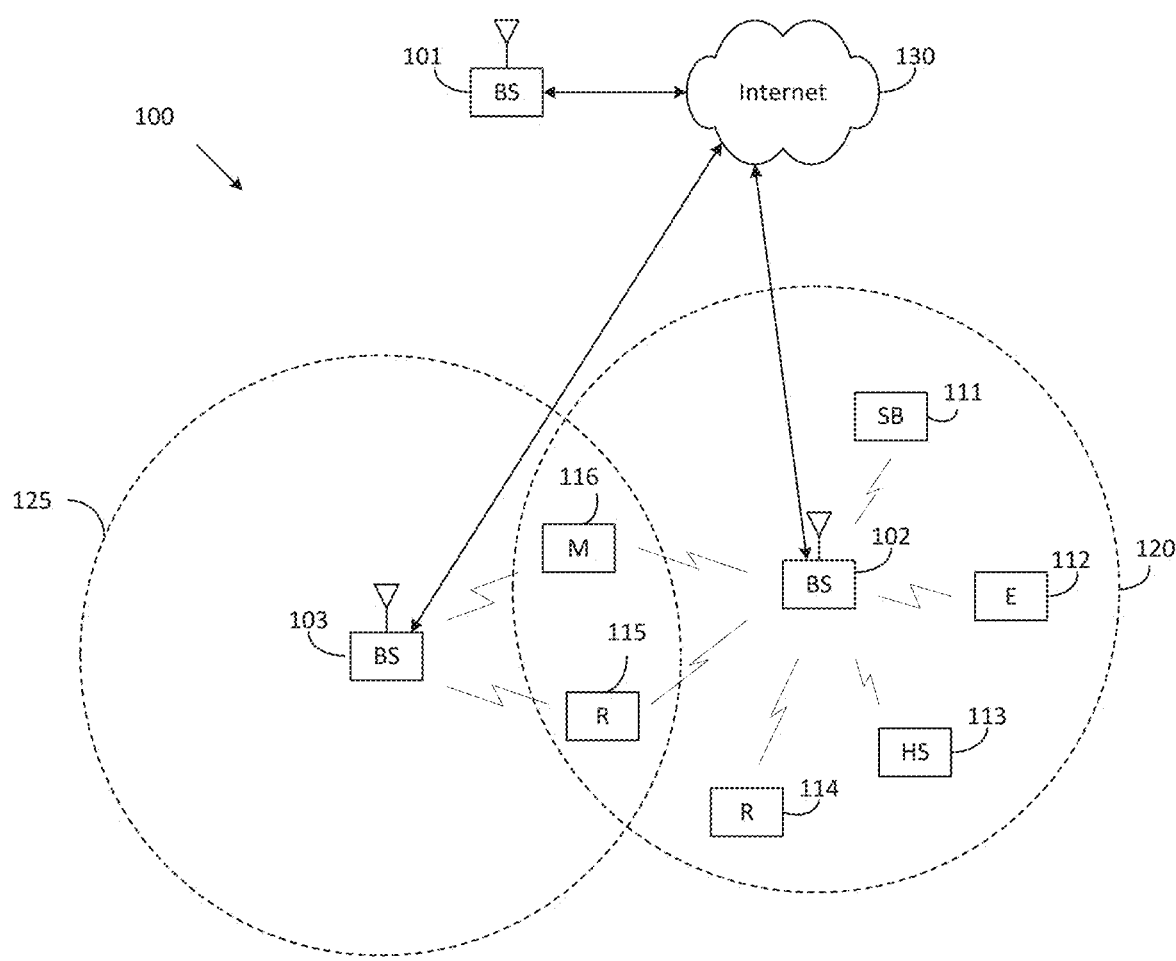
FIG. 1 illustrates an example of wireless network according to embodiments of the present disclosure.
Figure 2:
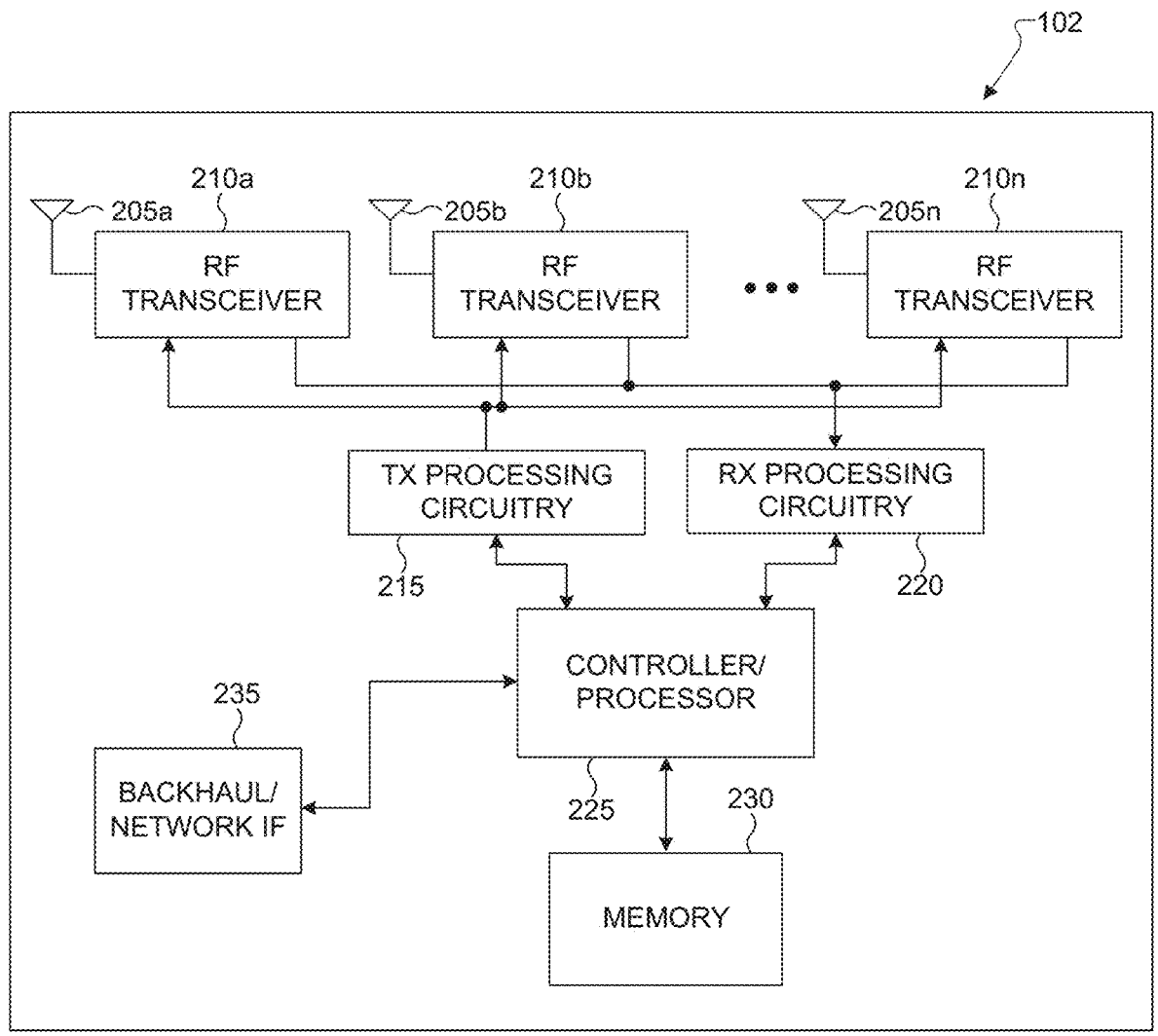
FIG. 2 illustrates an example of gNB according to embodiments of the present disclosure.
Figure 3:
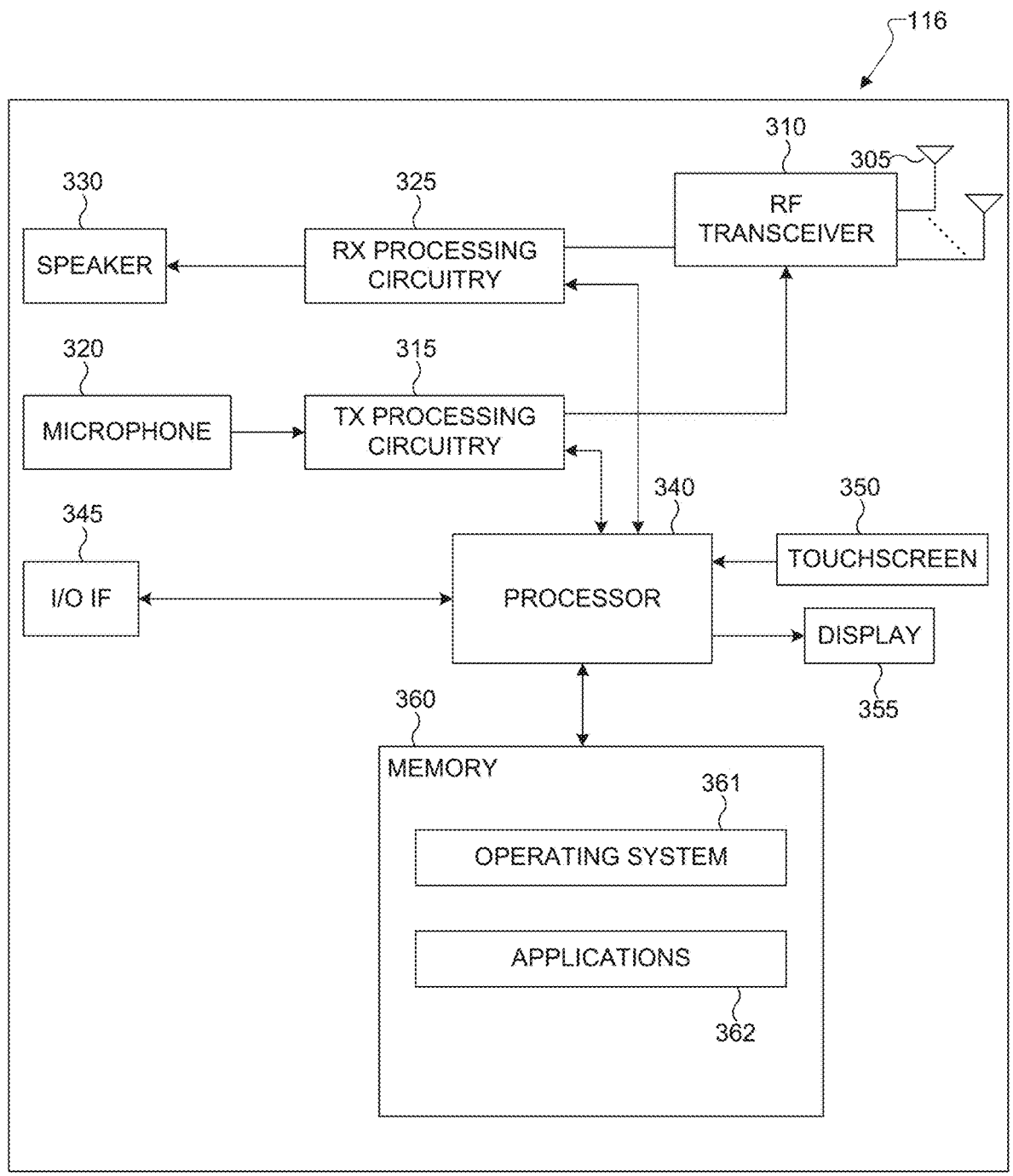
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal,"

"wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for a CSI resource configuration in a wireless communication system. In certain embodiments, and one or more of the gNBs 101-103 includes circuitry, programming, or a combination thereof, for a CSI resource configuration in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a CSI resource configuration in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a CSI resource configuration in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
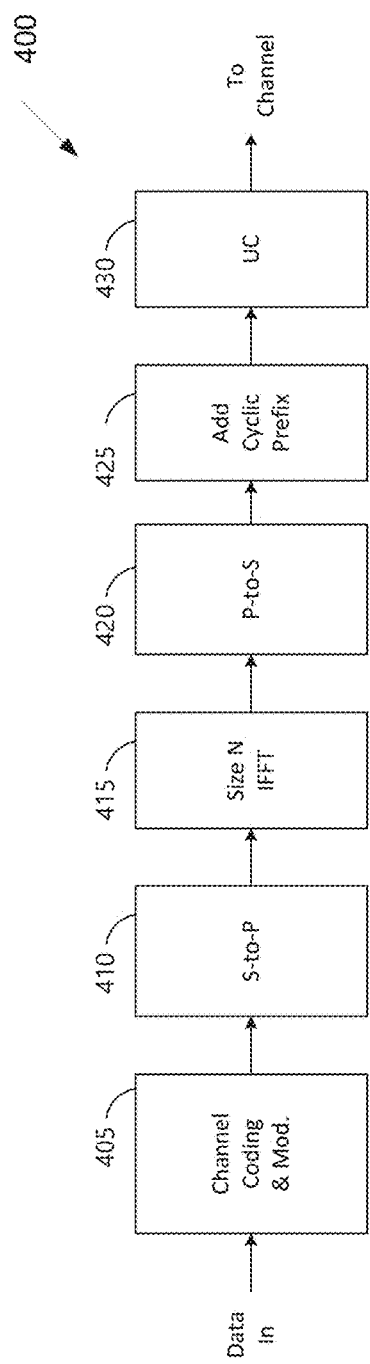
FIGS. 4 and 5 illustrate example of wireless transmit and receive paths according to this disclosure.
Figure 5:
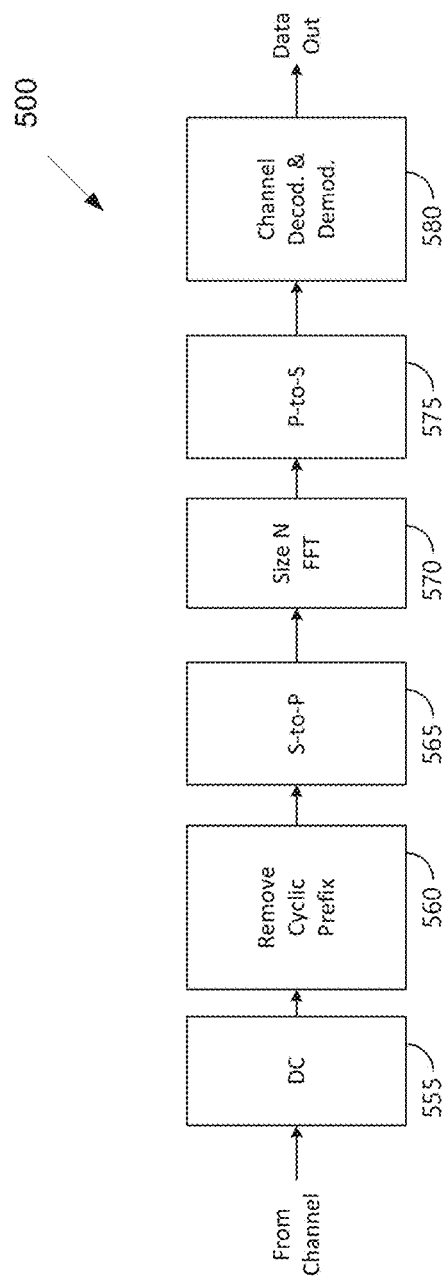

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
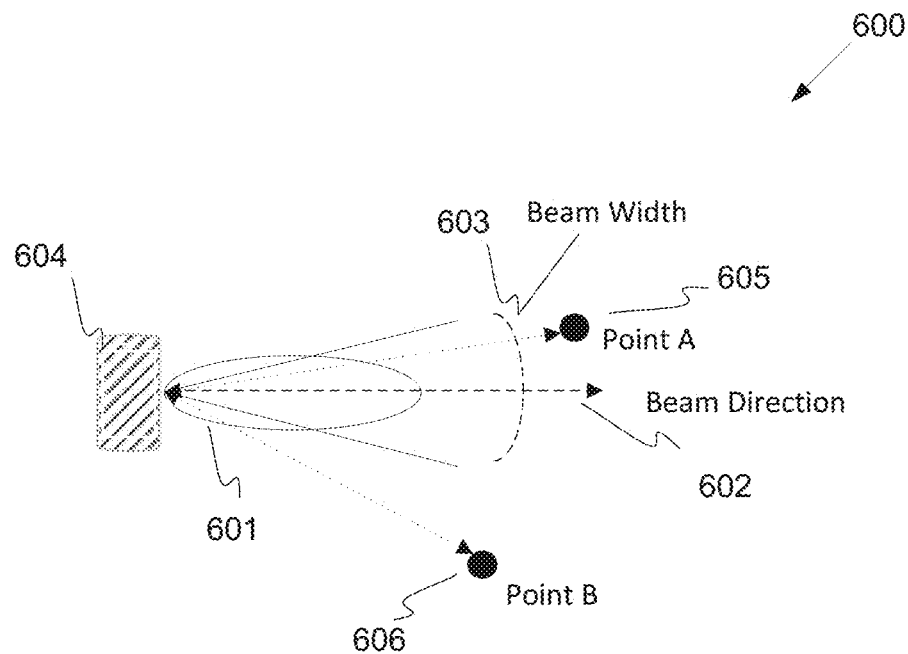
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
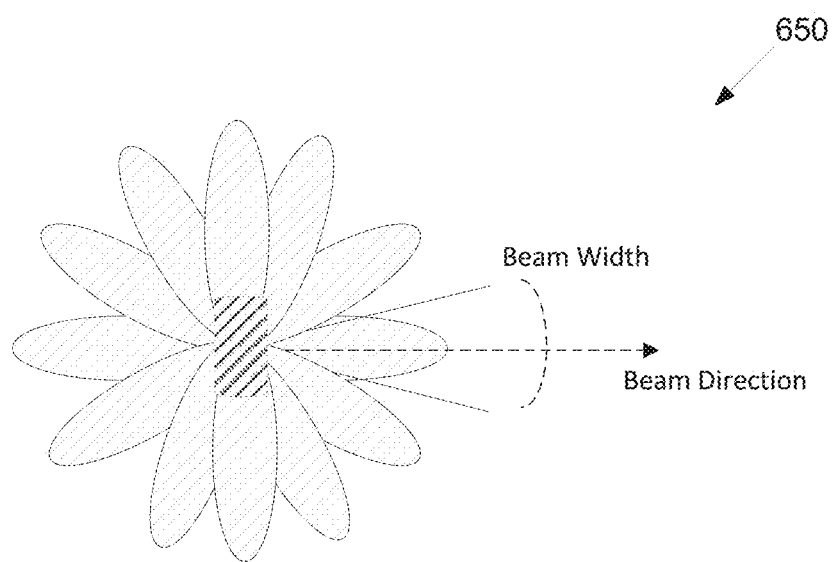
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
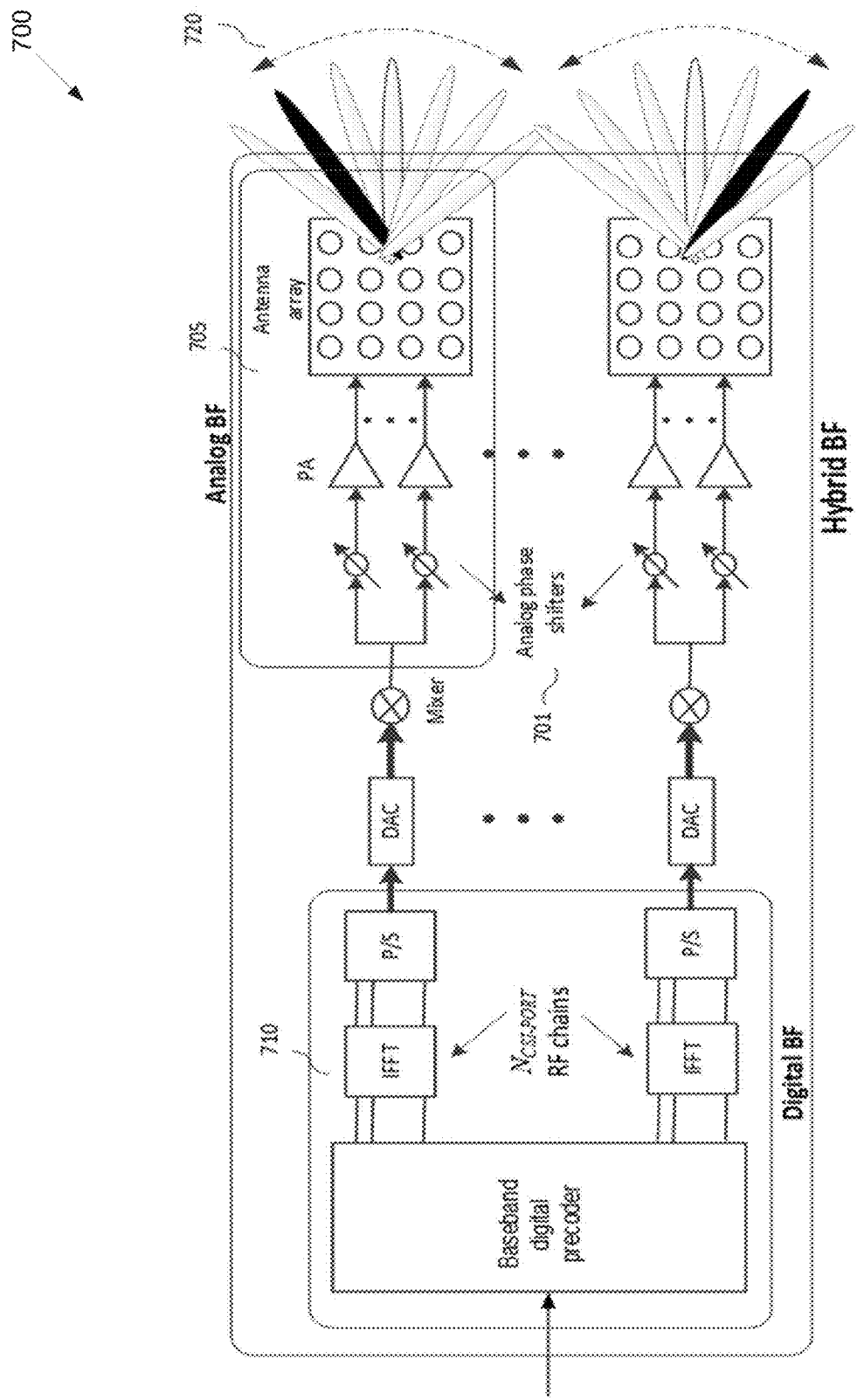
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Figure 8:
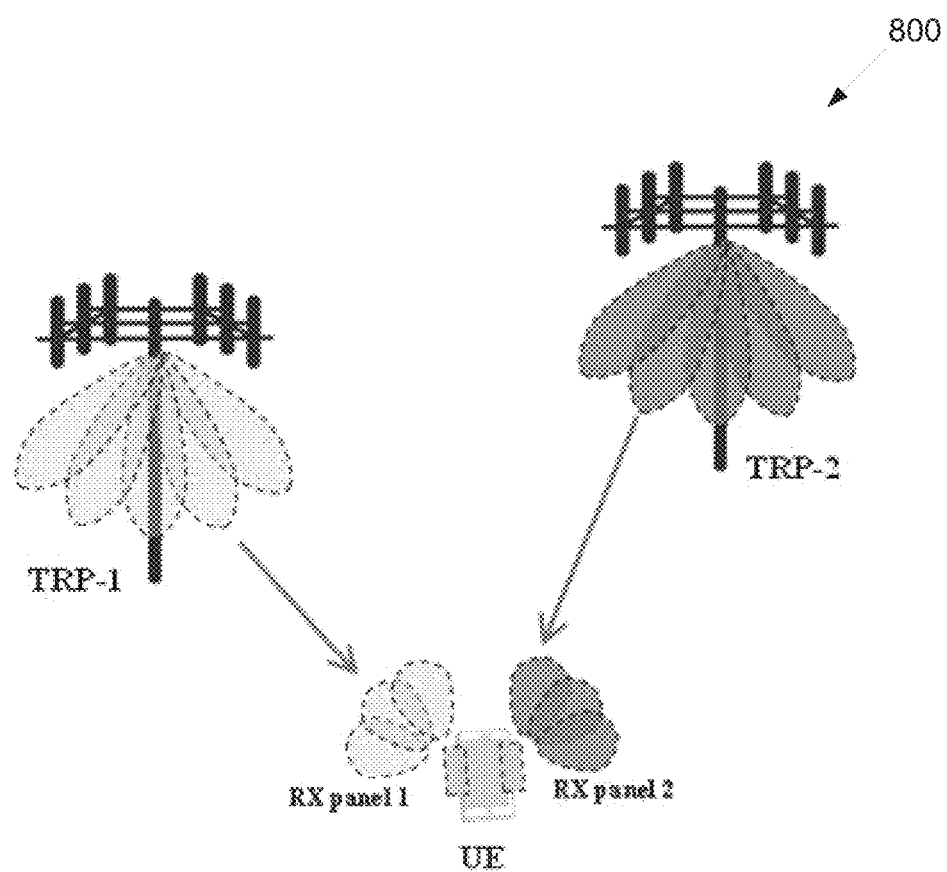
FIG. 8 illustrates an example of multi-TRP system according to embodiments of the present disclosure.

FIG. 8 illustrates an example of multi-TRP system 800 according to embodiments of the present disclosure. An embodiment of the multi-TRP system 800 shown in FIG. 8 is for illustration only.

In a multiple transmission and reception point (TRP) system depicted in FIG. 8, the UE could simultaneously receive from multiple physically non-co-located TRPs various channels/RSs such as PDCCHs and/or PDSCHs using either a single receive (RX) panel or multiple RX panels. In this disclosure, a RX panel could correspond to a set of RX antenna elements/ports at the UE, a set of measurement RS resources such as SRS resources, a spatial domain RX filter or etc. Further, a TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with an indicator; (4) a plurality of CORESETs associated with a CORESETPoolIndex; (5) a plurality of CORESETs associated with a TRP-specific index/indicator/identity.

To better enable the multi-TRP operation, the UE is expected to separately measure the channels from different coordinating TRPs. Hence, the CSI resource setting/configuration, e.g., how to separately configure CSI-RS resources for different coordinating TRPs, needs to be customized for the multi-TRP operation. Necessary network/UE configuration/indication to support the separate CSI/beam measurement for the multi-TRP system also needs to be specified.

The present disclosure provides various design aspects/enhancements for the CSI resource setting/configuration for the multi-TRP operation. The corresponding necessary network/UE configuration/indication methods are also specified.

In the present disclosure, the UE could be higher layer configured/indicated by the network multiple SSB/CSI-RS resource subsets in a single SSB/CSI-RS resource set (and therefore in a single CSI resource setting), or/and multiple SSB/CSI-RS resource sets in a single CSI resource setting, or/and multiple CSI resource settings for the multi-TRP operation.

Furthermore, throughout the present disclosure, a CSI-RS resource set can represent a CSI resource set and vice versa. In the present disclosure, a CSI resource set or a CSI-RS resource set could correspond to a channel measurement resource (CMR) set, e.g., provided by higher layer parameter CSI-SSB-ResourceSet or NZP-CSI-RS-ResourceSet.

In one embodiment of 1.A, multiple SSB/CSI-RS resource subsets configured in a single SSB/CSI-RS resource set (in a single CSI resource setting) for multi-TRP operation are provided.

The UE could be higher layer configured by the network M=1 CSI resource setting (e.g., via the higher layer parameter CSI-ResourceConfig) for the multi-TRP operation, and the configured CSI resource setting could comprise of S=1 SSB/CSI-RS resource set (e.g., configured to the UE via the higher layer parameter CSI-SSB-ResourceSet/NZP-CSI-RS-ResourceSet). The SSB/CSI-RS resource set could comprise of at least two ($K_s \leq 2$) SSB/CSI-RS resources. The $K_s$ SSB/CSI-RS resources configured in the SSB/CSI-RS resource set could be divided into $M_s > 1$ SSB/CSI-RS resource subsets (denoted by the first SSB/CSI-RS resource subset, the second SSB/CSI-RS resource subset, . . . , and the $M_s$-th SSB/CSI-RS resource subset), each corresponding to/associated with a coordinating TRP in the multi-TRP system.

There could be various means to divide the total SSB/CSI-RS resources in the SSB/CSI-RS resource set into $M_s$ SSB/CSI-RS resource subsets. In general, the r-th (r=1, . . . , $M_s$) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) could comprise of $k_r$ SSB/CSI-RS resources; the SSB/CSI-RS resource set containing the $M_s$ SSB/CSI-RS resource subsets therefore has a total of $K_s = \Sigma_{r=1}^{M_s} k_r$ SSB/CSI-RS resources. The UE could be configured/indicated by the network the values of $k_1, k_2, \ldots, k_{M_s}$ via higher layer RRC or/and MAC CE or/and dynamic DCI based signaling.

In one example, the values of $k_1, k_2, \ldots, k_{M_s}$ could be deterministic/fixed per RRC configuration and configured/indicated to the UE via higher layer RRC signaling (e.g., via higher layer parameter CSI-ResourceConfig). For instance, for $M_s=2$ ($K_s=k_1+k_2$), $k_1$ could correspond to the first half of the SSB/CSI-RS resources in the SSB/CSI-RS resource set (i.e., $k_1=K_s/2$), and $k_2$ could correspond to the second half of the SSB/CSI-RS resources in the SSB/CSI-RS resource set ($k_2=K_s/2$). For $M_s=2$ ($K_s=k_1+k_2$), the UE could also receive from the network a bitmap of length $K_s$ with each bit in the bitmap corresponding to a SSB/CSI-RS resource in the SSB/CSI-RS resource set; each bit in the bitmap could indicate whether the corresponding/associated SSB/CSI-RS resource is in the first SSB/CSI-RS resource subset (containing the $k_1$ SSB/CSI-RS resources) or the second SSB/CSI-RS resource subset (containing the $k_2$ SSB/CSI-RS resources); e.g., a bit configured as "1" in the bitmap indicates that the corresponding/associated SSB/CSI-RS resource is in the first SSB/CSI-RS resource subset (containing the $k_1$ SSB/CSI-RS resources), and a bit configured as "0" in the bitmap indicates that the corresponding/associated SSB/CSI-RS resource is in the second SSB/CSI-RS resource subset (containing the $k_2$ SSB/CSI-RS resources).

In another example, the UE could be first higher layer configured/indicated by the network (e.g., via RRC signaling) one or more sets of candidate values of $k_1, k_2, \ldots, k_{M_s}$. The UE could then receive from the network one or more MAC CE command that activates/selects one set of values of $k_1, k_2, \ldots, k_{M_s}$ out of all sets of candidate values of $k_1, k_2, \ldots, k_{M_s}$. In yet another example, the UE could be configured by the network the exact values of $k_1, k_2, \ldots, k_{M_s}$ via dynamic DCI indication.

In yet another example, the UE could receive from the network $M_s$ bitmaps, each corresponding to/associated with a SSB/CSI-RS resource subset; the r-th (r=1, . . . , $M_s$) bitmap with length $K_s$ could correspond to the r-th (r=1, . . . , $M_s$) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) comprising of $k_r$ SSB/CSI-RS resources; each bit in the r-th (r=1, . . . , $M_s$) bitmap could indicate whether the corresponding/associated SSB/CSI-RS resource is in the r-th SSB/CSI-RS resource subset or not. The $M_s$ SSB/CSI-RS resource subsets in the SSB/CSI-RS resource set could also form a list of SSB/CSI-RS resource subsets with $M_s$ entries (denoted by csi-RS-ResourceSubSetList), which could be configured to the UE, e.g., via the higher layer parameter CSI-ResourceConfig. There could be various association rules/mapping relationships between the $M_s$ SSB/CSI-RS resource subsets in the SSB/CSI-RS resource set and the coordinating TRPs in the multi-TRP system.

In one example of Option-1.A.1, the mapping/association between the $M_s$ SSB/CSI-RS resource subsets and the coordinating TRPs in the multi-TRP system can be established in an implicit manner. For instance, for $M_s=2$, the first SSB/CSI-RS resource subset containing, e.g., the first half of the SSB/CSI-RS resources in the SSB/CSI-RS resource set, could be mapped to a first TRP, from which the CORESETs configured with CORESETPoolIndex=0 are transmitted, and the second SSB/CSI-RS resource subset containing, e.g., the second half of the SSB/CSI-RS resources in the SSB/CSI-RS resource set, could be mapped to a second TRP, from which the CORESETs configured with CORESETPoolIndex=1 are transmitted.

In another example, the first configured SSB/CSI-RS resource subset, e.g., with the lowest SSB/CSI-RS resource subset ID denoted by CSI-SSB-ResourceSubSetId/NZP-CSI-RS-ResourceSubSetId, could be mapped to/associated with the TRP with the lowest PCI value/other higher layer signaling index value, and the second configured SSB/CSI-RS resource subset, e.g., with the second lowest CSI-SSB-ResourceSubSetId/NZP-CSI-RS-ResourceSubSetId, could be mapped to/associated with the TRP with the second lowest PCI value/other higher layer signaling index value, and so on, and the last/$M_s$-th configured SSB/CSI-RS resource subset, e.g., with the highest CSI-SSB-ResourceSubSetId/NZP-CSI-RS-ResourceSubSetId, could be mapped to/associated with the TRP with the highest PCI value/other higher layer signaling index value.

In yet another example, the $M_s$ SSB/CSI-RS resource subsets could be associated with the TRPs through their configured one or more TCI states; each TCI state is linked to a TRP in the multi-TRP system, e.g., via the TRP-specific higher layer signaling index, such as TRP ID, PCI, CORESETPoolIndex, SSB set ID and/or etc. Other implicit mapping/association rules between the SSB/CSI-RS resource subsets in the SSB/CSI-RS resource set and the coordinating TRPs in the multi-TRP system are also possible, and the implicit mapping/association rules may be known to the UE a prior.

In one example of Option-1.A.2, the UE could be explicitly indicated by the network regarding the mapping relationship between the SSB/CSI-RS resource subsets (and therefore, the SSB/CSI-RS resources therein) in the SSB/CSI-RS resource set and the TRPs in the multi-TRP system. In one example, a TRP-specific higher layer signaling index, such as TRP ID, PCI, CORESETPoolIndex, SSB set ID and/or etc., could be incorporated into the CSI-SSB-resource/NZP-CSI-RS-Resource.

In another example, the UE could be first indicated/configured by the network a list of TRP-specific higher layer signaling index values, such as TRP IDs, PCI values, CORESETPoolIndex values, SSB set IDs and/or etc. The first configured SSB/CSI-RS resource subset (e.g., the first entry in csi-RS-ResourceSubSetList and/or with the lowest CSI-SSB-ResourceSubId/NZP-CSI-RS-ResourceSubSetId) could be mapped to the first entry in the list of TRP-specific higher layer signaling index values, the second configured SSB/CSI-RS resource subset (e.g., the second entry in csi-RS-ResourceSubSetList and/or with the second lowest CSI-SSB-ResourceSubSetId/NZP-CSI-RS-ResourceSubSetId) could be mapped to the second entry in the list of TRP-specific higher layer signaling index values, and so on, and the last/Ms-th configured SSB/CSI-RS resource subset (e.g., the last/Ms-th entry in csi-RS-ResourceSubSetList and/or with the highest CSI-SSB-ResourceSubSetId/NZP-CSI-RS-ResourceSubSetId) could be mapped to the last entry in the list of TRP-specific higher layer signaling index values. Other methods of explicitly indicating/configuring the association rules/mapping relationships between the SSB/CSI-RS resource subsets (and therefore, the SSB/CSI-RS resources therein) in the SSB/CSI-RS resource set and the coordinating TRPs are also possible.

In another example of Option-1.A.3, the UE could be higher layer configured by the network with S=1 SSB/CSI-RS resource set in M=1 CSI resource setting (e.g., via the higher layer parameter CSI-ResourceConfig), and the SSB/CSI-RS resources in the SSB/CSI-RS resource set are divided into multiple (Ms>1) SSB/CSI-RS resource subsets. As discussed above, the UE could be configured/indicated by the network how the SSB/CSI-RS resources in the SSB/CSI-RS resource set are divided into the Ms>1 SSB/CSI-RS resource subsets. In this case, the UE may not need to know the association rule/mapping relationship between the SSB/CSI-RS resource subsets (and therefore, the SSB/CSI-RS resources therein) and the coordinating TRPs in the multi-TRP system, unlike those presented in Option-1.A.1 and Option-1.A.2.

In one embodiment of 1.B, multiple SSB/CSI-RS resource sets configured in a single CSI resource setting for multi-TRP operation are provided.

The UE could be higher layer configured by the network (e.g., via the higher layer parameter CSI-ResourceConfig) M=1 CSI resource setting for the multi-TRP operation. In the configured CSI resource setting, the UE could be higher layer configured by the network S>1 SSB/CSI-RS resource sets (e.g., via the higher layer parameter CSI-SSB-ResourceSet/NZP-CSI-RS-ResourceSet, denoted by the first SSB/CSI-RS resource set, the second SSB/CSI-RS resource set, . . . , and the S-th SSB/CSI-RS resource set), each corresponding to/associated with a coordinating TRP in the multi-TRP system. There could be various association rules/mapping relationships between the S>1 SSB/CSI-RS resource sets and the coordinating TRPs in the multi-TRP system.

In one example of Option-1.B.1, the mapping/association between the S>1 SSB/CSI-RS resource sets in the CSI resource setting and the coordinating TRPs can be established in an implicit manner. For instance, for S=2, the first configured SSB/CSI-RS resource set, e.g., the first entry in csi-RS-ResourceSetList and/or with a smaller SSB-ResourceSetId/NZP-CSI-RS-ResourceSetId, could be mapped to/associated with a first TRP, from which the CORESETs configured with CORESETPoolIndex=0 are transmitted, and the second configured SSB/CSI-RS resource set, e.g., the second entry in csi-RS-ResourceSetList and/or with a larger SSB-ResourceSetId/NZP-CSI-RS-ResourceSetId, could be mapped to/associated with a second TRP, from which the CORESETs configured with CORESETPoolIndex=1 are transmitted.

In another example, the first configured SSB/CSI-RS resource set, e.g., the first entry in csi-RS-ResourceSetList and/or with the lowest SSB-ResourceSetId/NZP-CSI-RS-ResourceSetId, could be mapped to/associated with the TRP with the lowest PCI value/other higher layer signaling index value, and the second configured SSB/CSI-RS resource set, e.g., the second entry in csi-RS-ResourceSetList and/or with the second lowest SSB-ResourceSetId/NZP-CSI-RS-ResourceSetId, could be mapped to/associated with the TRP with the second lowest PCI value/other higher layer signaling index value, and so on, and the last configured SSB/CSI-RS resource set, e.g., the last entry in csi-RS-ResourceSetList and/or with the highest SSB-ResourceSetId/NZP-CSI-RS-ResourceSetId, could be mapped to/associated with the TRP with the highest PCI value/other higher layer signaling index value.

In yet another example, the S>1 SSB/CSI-RS resource sets could be associated with the TRPs through their configured one or more TCI states; each TCI state is linked to a TRP in the multi-TRP system, e.g., via the TRP-specific higher layer signaling index, such as TRP ID, PCI, CORESETPoolIndex, SSB set ID and/or etc. Other implicit mapping/association rules between the SSB/CSI-RS resource sets in the CSI resource setting and the coordinating TRPs in the multi-TRP system are also possible, and the implicit mapping/association rules may be known to the UE a prior.

In one example of Option-1.B.2, the UE could be explicitly indicated by the network regarding the mapping relationship between the SSB/CSI-RS resource sets in the CSI resource setting and the TRPs in the multi-TRP system. In one example, a TRP-specific higher layer signaling index, such as TRP ID, PCI, CORESETPoolIndex, SSB set ID and/or etc., could be incorporated into the NZP-CSI-RS-ResourceSet/CSI-SSB-ResourceSet.

In another example, the UE could be first indicated/configured by the network a list of TRP-specific higher layer signaling index values, such as TRP IDs, PCI values, CORESETPoolIndex values, SSB set IDs and/or etc. The first configured SSB/CSI-RS resource set (e.g., the first entry in csi-RS-ResourceSetList and/or with the lowest SSB-ResourceSetId/NZP-CSI-RS-ResourceSetId) could be mapped to the first entry in the list of TRP-specific higher layer signaling index values, the second configured SSB/CSI-RS resource set (e.g., the second entry in csi-RS-ResourceSetList and/or with the second lowest SSB-ResourceSetId/NZP-CSI-RS-ResourceSetId) could be mapped to the second entry in the list of TRP-specific higher layer signaling index values, and so on, and the last/S-th configured SSB/CSI-RS resource set (e.g., the last/S-th entry in csi-RS-ResourceSetList and/or with the highest SSB-ResourceSetId/NZP-CSI-RS-ResourceSetId) could be mapped to the last entry in the list of TRP-specific higher layer signaling index values.

Other methods of explicitly indicating/configuring the association rules/mapping relationships between the SSB/CSI-RS resource sets in the CSI resource setting and the coordinating TRPs are also possible.

In one example of Option-1.B.3, the UE could be configured by the network with multiple SSB/CSI-RS resource sets (e.g., via the higher layer parameter CSI-SSB-ResourceSet/NZP-CSI-RS-ResourceSet) in a single CSI resource setting (e.g., via the higher layer parameter CSI-ResourceConfig), each with a unique SSB-ResourceSetId/

NZP-CSI-RS-ResourceSetId. The association between the SSB-ResourceSetId's/NZP-CSI-RS-ResourceSetId's (and therefore, the corresponding SSB/CSI-RS resource sets) and the TRPs in the multi-TRP system could follow the corresponding examples discussed in Option-1.B.1 and Option-1.B.2.

In one example of Option-1.B.4, the UE could be configured by the network with multiple SSB/CSI-RS resource sets (e.g., via the higher layer parameter CSI-SSB-ResourceSet/NZP-CSI-RS-ResourceSet) with the same SSB-ResourceSetId/NZP-CSI-RS-ResourceSetId. In this case, a certain SSB/CSI-RS re-indexing is needed for one or more of the SSB/CSI-RS resource sets (CSI-SSB-ResourceSet's/NZP-CSI-RS-ResourceSet's).

For instance, the UE could be configured by the network with two SSB/CSI-RS resource sets in one CSI-ResourceConfig, denoted by CSI-SSB-ResourceSet1/NZP-CSI-RS-ResourceSet1 and CSI-SSB-ResourceSet2/NZP-CSI-RS-ResourceSet2, associated with TRP-1 and TRP-2 in the multi-TRP system shown in FIG. 8, respectively. The SSB/NZP CSI-RS resources (CSI-SSB-Resources/nzp-CSI-RS-Resources) in CSI-SSB-ResourceSet1/NZP-CSI-RS-ResourceSet1 are indexed as {1, 2, . . . , maxNrofCSI-SSB-ResourcesPerSet1}/{1, 2, . . . , maxNrofNZP-CSI-RS-ResourcesPerSet1}, while after applying SSB/CSI-RS re-indexing for CSI-SSB-ResourceSet2/NZP-CSI-RS-ResourceSet2, the SSB/NZP CSI-RS resources in CSI-SSB-ResourceSet2/NZP-CSI-RS-ResourceSet2 are indexed as {maxNrofCSI-SSB-ResourcesPerSet1+1, maxNrofCSI-SSB-ResourcesPerSet1+2, . . . , maxNrofCSI-SSB-ResourcesPerSet1+maxNrofCSI-SSB-ResourcesPerSet2}/{maxNrofNZP-CSI-RS-ResourcesPerSet1+1, maxNrofNZP-CSI-RS-ResourcesPerSet1+2, . . . , maxNrofNZP-CSI-RS-ResourcesPerSet1+maxNrofNZP-CSI-RS-ResourcesPerSet2}.

Note that if the SSB/CSI-RS re-indexing is not applied to CSI-SSB-ResourceSet2/NZP-CSI-RS-ResourceSet2, the SSB/NZP CSI-RS resources in CSI-SSB-ResourceSet2/NZP-CSI-RS-ResourceSet2 are indexed as {1, 2, . . . , maxNrofCSI-SSB-ResourcesPerSet2}/{1, 2, . . . , maxNrofNZP-CSI-RS-ResourcesPerSet2}.

In one embodiment of 1.C, multiple CSI resource settings configured for multi-TRP operation are provided.

The UE could be higher layer configured by the network (e.g., via the higher layer parameter CSI-ResourceConfig) M>1 CSI resource settings for the multi-TRP operation with at least one (S=1) SSB/CSI-RS resource set per CSI resource setting, and each CSI resource setting is associated with/corresponds to a coordinating TRP in the multi-TRP system; the M>1 CSI resource settings configured for the multi-TRP operation could be denoted by the first CSI resource setting, the second CSI resource setting, . . . , and the M-th CSI resource setting. There could be various association rules/mapping relationships between the M>1 CSI resource settings and the coordinating TRPs in the multi-TRP system.

In one example of Option-1.C.1, the mapping/association between the M CSI resource settings and the coordinating TRPs can be established in an implicit manner. For instance, for M=2, one configured CSI resource setting with a lower CSI-ResourceConfigId could be mapped to a first TRP, from which the CORESETs configured with CORESETPoolIndex=0 are transmitted, and the other configured CSI resource setting with a higher CSI-ResourceConfigId could be mapped to a second TRP, from which the CORESETs configured with CORESETPoolIndex=1 are transmitted.

In another example, the first configured CSI resource setting (e.g., with the lowest CSI-ResourceConfigId) could be mapped to the TRP with the lowest PCI value/other higher layer signaling index value, the second configured CSI resource setting (e.g., with the second lowest CSI-ResourceConfigId) could be mapped to the TRP with the second lowest PCI value/other higher layer signaling index value, and so on, and the last/M-th configured CSI resource setting (e.g., with the highest CSI-ResourceConfigId) could be mapped to the TRP with the highest PCI value/other higher layer signaling index value.

In yet another example, the M>1 CSI resource settings could be associated with the TRPs through their configured one or more TCI states; each TCI state is linked to a TRP in the multi-TRP system, e.g., via the TRP-specific higher layer signaling index, such as TRP ID, PCI, CORESETPoolIndex, SSB set ID and/or etc. Other implicit mapping/association rules between the CSI resource settings and the coordinating TRPs are also possible, and the implicit mapping/association rules may be known to the UE a prior.

In one example of Option-1.C.2, the UE could be explicitly indicated by the network regarding the mapping relationship between the M>1 CSI resource settings and the TRPs. In one example, a TRP-specific higher layer signaling index, such as TRP ID, PCI, CORESETPoolIndex, SSB set ID and/or etc., could be incorporated into the CSI-ResourceConfig.

In another example, the UE could be first higher layer configured by the network a list of TRP-specific higher layer signaling index values, such as TRP IDs, PCI values, CORESETPoolIndex values, SSB set IDs and/or etc. The first configured CSI resource setting (e.g., with the lowest CSI-ResourceConfigId) could be mapped to the first entry in the list of TRP-specific higher layer signaling index values, the second configured CSI resource setting (e.g., with the second lowest CSI-ResourceConfigId) could be mapped to the second entry in the list of TRP-specific higher layer signaling index values, and so on, and the last/M-th configured CSI resource setting (e.g., with the highest CSI-ResourceConfigId) could be mapped to the last entry in the list in TRP-specific higher layer signaling index values. Other methods of explicitly indicating/configuring the association rules/mapping relationships between the CSI resource settings and the coordinating TRPs are also possible.

In one example of Option-1.C.3, the UE could be configured by the network with multiple CSI resource settings, each with a unique CSI-ResourceConfigId. The association between the CSI-ResourceConfigId's (and therefore, the corresponding CSI resource settings) and the TRPs in the multi-TRP system could follow the corresponding examples discussed in Option-1.C.1 and Option-1.C.2.

In one example of Option-1.C.4, the UE could be configured by the network with multiple CSI resource settings with the same CSI-ResourceConfigId. In this case, certain SSB/CSI-RS re-indexing is needed for one or more of the CSI resource settings (CSI-ResourceConfig's). For instance, the UE could be configured by the network with two CSI resource settings, CSI-ResourceConfig1 and CSI-ResourceConfig2 each containing a single SSB/CSI-RS resource set, associated with TRP-1 and TRP-2 in the multi-TRP system shown in FIG. 8, respectively.

The SSB/NZP CSI-RS resources (CSI-SSB-Resources/nzp-CSI-RS-Resources) in the SSB/CSI-RS resource set (CSI-SSB-ResourceSet/NZP-CSI-RS-ResourceSet) in CSI-ResourceConfig1 are indexed as {1, 2, . . . , maxNrofCSI-SSB-ResourcesPerSet1}/{1, 2, . . . , maxNrofNZP-CSI-RS-ResourcesPerSet1}, while after applying SSB/CSI-RS re-indexing for CSI-ResourceConfig2, the SSB/NZP CSI-RS resources in the SSB/CSI-RS resource set in CSI- ResourceConfig2 are indexed as {maxNrofCSI-SSB-ResourcesPerSet1+1, maxNrofCSI-SSB-ResourcesPerSet1+2, . . . , maxNrofCSI-SSB-ResourcesPerSet1+maxNrofCSI-SSB-ResourcesPerSet2}/{maxNrofNZP-CSI-RS-ResourcesPerSet1+1, maxNrofNZP-CSI-RS-ResourcesPerSet1+2, . . . , maxNrofNZP-CSI-RS-ResourcesPerSet1+maxNrofNZP-CSI-RS-ResourcesPerSet2}.

Note that if the SSB/CSI-RS re-indexing is not applied to CSI-SSB-ResourceConfig2/CSI-ResourceConfig2, the SSB/NZP CSI-RS resources in the SSB/CSI-RS resource set in CSI-ResourceConfig2 are indexed as {1, 2, . . . , maxNrofCSI-SSB-ResourcesPerSet2}/{1, 2, . . . , maxNrofNZP-CSI-RS-ResourcesPerSet2}.

The UE could be explicitly indicated by the network how the SSB/CSI-RS resources are configured, e.g., configured in $M_s$>1 SSB/CSI-RS resource subsets in a SSB/CSI-RS resource set (and therefore, in a CSI resource setting), configured in S>1 SSB/CSI-RS resource sets in a CSI resource setting, and/or configured in M>1 CSI resource settings; this indication could be via higher layer (RRC) or/and MAC CE or/and DCI based signaling or/and any combination of at least two of RRC, MAC CE and DCI based signaling. The UE could be implicitly indicated by the network how the SSB/CSI-RS resources are configured.

For example, when the higher layer parameter reportQuantity associated with all the reporting settings is set to "cri-RSRP," the CSI-RS resources could be configured in S>1 CSI-RS resource sets in a CSI resource setting and/or M>1 CSI resource settings. When the higher layer parameter reportQuantity associated with all the reporting settings is set to "cri-SINR," the CSI-RS resources could be configured in $M_s$>1 CSI-RS resource subsets in a CSI-RS resource set (and therefore, in a CSI resource setting). Other implicit indication methods are also possible.

Alternatively, the UE could indicate to the network their preference(s) and/or capability signaling of how the SSB/CSI-RS resources may be configured, e.g., configured in $M_s$>1 SSB/CSI-RS resource subsets in an SSB/CSI-RS resource set (and therefore, in a CSI resource setting), configured in S>1 SSB/CSI-RS resource sets in a CSI resource setting, and/or configured in M>1 CSI resource settings.

Various rules/configurations of counting/calculating the SSB/CSI-RS resources within the same SSB/CSI-RS resource subset, the same SSB/CSI-RS resource set or the same CSI resource setting, or across different SSB/CSI-RS resource subsets, different SSB/CSI-RS resource sets or different CSI resource settings could be designed/customized for the CSI resource configuration methods discussed in the aforementioned embodiments, 1.A, 1.B, and 1.C in the present disclosure.

In one embodiment of 2.A, SSB/CSI-RS resource counting rules/configurations for multiple SSB/CSI-RS resource subsets configured in a single SSB/CSI-RS resource set (in a single CSI resource setting) for multi-TRP operation are provided.

The UE could be higher layer configured by the network M=1 CSI resource setting (e.g., via the higher layer parameter CSI-ResourceConfig) for the multi-TRP operation, and the configured CSI resource setting could comprise of S=1 SSB/CSI-RS resource set (e.g., configured to the UE via the higher layer parameter CSI-SSB-ResourceSet/NZP-CSI-RS-ResourceSet). The SSB/CSI-RS resource set could comprise of at least two ($K_s \geq 2$) SSB/CSI-RS resources. The $K_s$ SSB/CSI-RS resources configured in the SSB/CSI-RS resource set could be divided into $M_s$>1 SSB/CSI-RS resource subsets (denoted by the first SSB/CSI-RS resource subset, the second SSB/CSI-RS resource subset, . . . , and the $M_s$-th SSB/CSI-RS resource subset), each corresponding to/associated with a coordinating TRP in the multi-TRP system.

There could be various means to divide the total SSB/CSI-RS resources in the SSB/CSI-RS resource set into $M_s$ SSB/CSI-RS resource subsets. In general, the r-th (r=1, . . . , $M_s$) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) could comprise of $k_r$ SSB/CSI-RS resources; the SSB/CSI-RS resource set containing the $M_s$ SSB/CSI-RS resource subsets therefore has a total of $K_s = \Sigma_{r=1}^{Ms} k_r$ SSB/CSI-RS resources. The UE could be configured/indicated by the network the values of $k_1, k_2, \ldots, k_{Ms}$ via higher layer RRC or/and MAC CE or/and dynamic DCI based signaling.

In one example, the values of $k_1, k_2, \ldots, k_{Ms}$ could be deterministic/fixed per RRC configuration and configured/indicated to the UE via higher layer RRC signaling (e.g., via higher layer parameter CSI-ResourceConfig). For instance, for $M_s$=2 ($K_s = k_1 + k_2$), $k_1$ could correspond to the first half of the SSB/CSI-RS resources in the SSB/CSI-RS resource set (i.e., $k_1 = K_s/2$), and $k_2$ could correspond to the second half of the SSB/CSI-RS resources in the SSB/CSI-RS resource set ($k_2 = K_s/2$). For $M_s$=2 ($K_s = k_1 + k_2$), the UE could also receive from the network a bitmap of length $K_s$ with each bit in the bitmap corresponding to a SSB/CSI-RS resource in the SSB/CSI-RS resource set; each bit in the bitmap could indicate whether the corresponding/associated SSB/CSI-RS resource is in the first SSB/CSI-RS resource subset (containing the $k_1$ SSB/CSI-RS resources) or the second SSB/CSI-RS resource subset (containing the $k_2$ SSB/CSI-RS resources); e.g., a bit configured as "1" in the bitmap indicates that the corresponding/associated SSB/CSI-RS resource is in the first SSB/CSI-RS resource subset (containing the $k_1$ SSB/CSI-RS resources), and a bit configured as "0" in the bitmap indicates that the corresponding/associated SSB/CSI-RS resource is in the second SSB/CSI-RS resource subset (containing the $k_2$ SSB/CSI-RS resources).

In another example, the UE could be first higher layer configured/indicated by the network (e.g., via RRC signaling) one or more sets of candidate values of $k_1, k_2, \ldots, k_{Ms}$. The UE could then receive from the network one or more MAC CE command that activates/selects one set of values of $k_1, k_2, \ldots, k_{Ms}$ out of all sets of candidate values of $k_1, k_2, \ldots, k_{Ms}$.

In yet another example, the UE could be configured by the network the exact values of $k_1, k_2, \ldots, k_{Ms}$ via dynamic DCI indication. In yet another example, the UE could receive from the network $M_s$ bitmaps, each corresponding to/associated with a SSB/CSI-RS resource subset; the r-th (r=1, . . . , $M_s$) bitmap with length $K_s$ could correspond to the r-th (r=1, . . . , $M_s$) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) comprising of $k_r$ SSB/CSI-RS resources; each bit in the r-th (r=1, . . . , $M_s$) bitmap could indicate whether the corresponding/associated SSB/CSI-RS resource is in the r-th SSB/CSI-RS resource subset or not.

The $M_s$ SSB/CSI-RS resource subsets in the SSB/CSI-RS resource set could also form a list of SSB/CSI-RS resource subsets with $M_s$ entries (denoted by csi-RS-ResourceSubSetList), which could be configured to the UE, e.g., via the higher layer parameter CSI-ResourceConfig.

In one example of Configuration-2.A.1, the SSB/CSI-RS resources configured in the S=1 SSB/CSI-RS resource set, and therefore, in the corresponding M=1 CSI resource setting, are independently/separately counted/indexed within each SSB/CSI-RS resource subset. Consider the r-th (r=1, . . . , $M_s$) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) comprising of $k_r$ SSB/CSI-RS resources. The $k_r$ SSB/CSI-RS resources in the r-th SSB/CSI-RS resource subset are indexed as {#1, #2, . . . , #$k_r$}, i.e., SSB/CSI-RS #1, SSB/CSI-RS #2, . . . , SSB/CSI-RS #$k_r$, and the corresponding SSBRIs/CRIs (if reported) are SSBRI/CRI #1, SSBRI/CRI #2, . . . , SSBRI/CRI #$k_r$.

Along with the report(s) of one or more SSBRIs/CRIs determined from the SSB/CSI-RS resources in one or more SSB/CSI-RS resource subsets, the UE could also indicate to the network which SSB/CSI-RS resource subset(s) the reported SSBRIs/CRIs are associated with/from. In one example, this indication could be the SSB/CSI-RS resource subset ID, e.g., CSI-SSB-ResourceSubSetId/NZP-CSI-RS-ResourceSubSetId.

In another example, this indication could be a flag indicator for $M_s$=2 with "1" indicating the first SSB/CSI-RS resource subset and "0" indicating the second SSB/CSI-RS resource subset. In yet another example, this indication could be a ceil(log 2($M_s$))-bit indicator indicating any of the $M_s$ SSB/CSI-RS resource subsets. Other rules/configurations of independently/separately counting/indexing the SSB/CSI-RS resources within each SSB/CSI-RS resource subset are also possible.

In one example of Configuration-2.A.2, the SSB/CSI-RS resources configured in the S=1 SSB/CSI-RS resource set, and therefore, in the corresponding M=1 CSI resource setting, are jointly counted/indexed across all the $M_s$ SSB/CSI-RS resource subsets. For example, all the $K_s$ SSB/CSI-RS resources configured in the S=1 SSB/CSI-RS resource set, and therefore, in the corresponding M=1 CSI resource setting, could be indexed as {#1, #2, . . . , #$K_s$}, i.e., SSB/CSI-RS #1, SSB/CSI-RS #2, . . . , SSB/CSI-RS #$K_s$. Hence, for the r-th (r=1, . . . , Ms) SSB/CSI-RS resource subset (e.g., with the r-th lowest/highest SSB/CSI-RS resource subset ID, denoted by CSI-SSB-ResourceSubSetId/NZP-CSI-RS-ResourceSubSetId) comprising of $k_r$ SSB/CSI-RS resources, the SSB/CSI-RS resources therein could be indexed as {#$k_{r-1}$+1, #$k_{r-1}$+2, . . . , #$k_{r-1}$+$k_r$}, i.e., SSB/CSI-RS #$k_{r-1}$+1, SSB/CSI-RS #$k_{r-1}$+2, . . . , SSB/CSI-RS #$k_{r-1}$+$k_r$, and the corresponding SSBRIs/CRIs (if reported) are SSBRI/CRI #$k_{r-1}$+1, SSBRI/CRI #$k_{r-1}$+2, . . . , SSBRI/CRI #$k_{r-1}$+$k_r$.

The UE may not need to indicate to the network which SSB/CSI-RS resource subset(s) the reported SSBRIs/CRIs are associated with/from because the reported SSBRIs/CRIs are different for different SSB/CSI-RS resource subsets. Other rules/configurations of jointly counting/indexing all the $K_s$ SSB/CSI-RS resources across all the $M_s$ SSB/CSI-RS resource subsets are also possible.

In one example of Configuration-2.A.3, the UE could be indicated by the network the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the SSB/CSI-RS resource subsets; this indication could be via higher layer (RRC) (e.g., via the higher layer parameter CSI-ReportConfig) or/and MAC CE or/and DCI based signaling or/and any combination of at least two of RRC, MAC CE and DCI based signaling; this indication could be via a separate (dedicated) parameter or joint with another parameter.

Alternatively, the UE could autonomously determine the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the SSB/CSI-RS resource subsets. In this case, the UE may also indicate to the network their determined association rule(s)/mapping relationship(s). For instance, the UE could be configured/indicated by the network to report in a single reporting instance a group of SSBRIs/CRIs for all the $M_s$ SSB/CSI-RS resource subsets. The UE could be further configured/indicated by the network that the first SSBRI/CRI in the group may correspond to the first SSB/CSI-RS resource subset (e.g., with the lowest SSB/CSI-RS resource subset ID, denoted by CSI-SSB-ResourceSubSetId/NZP-CSI-RS-ResourceSubSetId), the second SSBRI/CRI in the group may correspond to the second SSB/CSI-RS resource subset (e.g., with the second lowest SSB/CSI-RS resource subset ID, denoted by CSI-SSB-ResourceSubSetId/NZP-CSI-RS-ResourceSubSetId), and so on, and the last SSBRI/CRI in the group may correspond to the last/$M_s$-th SSB/CSI-RS resource subset (e.g., with the highest SSB/CSI-RS resource subset ID, denoted by CSI-SSB-ResourceSubSetId/NZP-CSI-RS-ResourceSubSetId).

The above described configuration method(s) can be applied to both SSB/CSI-RS resource counting/indexing methods in Configuration-2.A.1 and Configuration-2.A.2.

The UE could be higher layer configured (e.g., via higher layer RRC signaling) by the network the total number of SSB/CSI-RS resources $K_s$ across all $M_s$>1 SSB/CSI-RS resource subsets configured in the SSB/CSI-RS resource set.

In one embodiment of 2.B, SSB/CSI-RS resource counting rules/configurations for multiple SSB/CSI-RS resource sets configured in a single CSI resource setting for multi-TRP operation are provided.

The UE could be higher layer configured by the network (e.g., via the higher layer parameter CSI-ResourceConfig) M=1 CSI resource setting for the multi-TRP operation. In the configured CSI resource setting, the UE could be higher layer configured by the network S>1 SSB/CSI-RS resource sets (e.g., via the higher layer parameter CSI-SSB-Resource-Set/NZP-CSI-RS-ResourceSet, denoted by the first SSB/CSI-RS resource set, the second SSB/CSI-RS resource set, . . . , and the S-th SSB/CSI-RS resource set), each corresponding to/associated with a coordinating TRP in the multi-TRP system.

In one example of Configuration-2.B.1, the SSB/CSI-RS resources configured in the M=1 CSI resource setting, are independently/separately counted/indexed within each SSB/CSI-RS resource set. Consider the p-th (p=1, . . . , S) SSB/CSI-RS resource set (e.g., with the p-th lowest/highest SSB/CSI-RS resource set ID, denoted by SSB-ResourceSetId/NZP-CSI-RS-ResourceSetId) comprising of $l_p$ SSB/CSI-RS resources. The $l_p$ SSB/CSI-RS resources in the p-th SSB/CSI-RS resource set are indexed as {#1, #2, . . . , #$l_p$}, i.e., SSB/CSI-RS #1, SSB/CSI-RS #2, . . . , SSB/CSI-RS #$l_p$, and the corresponding SSBRIs/CRIs (if reported) are SSBRI/CRI #1, SSBRI/CRI #2, . . . , SSBRI/CRI #$l_p$. Along with the report(s) of one or more SSBRIs/CRIs determined from the SSB/CSI-RS resources in one or more SSB/CSI-RS resource sets, the UE could also indicate to the network which SSB/CSI-RS resource set(s) the reported SSBRIs/CRIs are associated with/from.

In one example, this indication could be the SSB/CSI-RS resource set ID, e.g., SSB-ResourceSetId/NZP-CSI-RS-ResourceSetId. In another example, this indication could be a flag indicator for S=2 with "1" indicating the first SSB/CSI- RS resource set and "0" indicating the second SSB/CSI-RS resource set. In yet another example, this indication could be a ceil(log 2(S))-bit indicator indicating any of the S>1 SSB/CSI-RS resource sets. Other rules/configurations of independently/separately counting/indexing the SSB/CSI-RS resources within each SSB/CSI-RS resource set are also possible.

In one example of Configuration-2.B.2, the SSB/CSI-RS resources configured in the M=1 CSI resource setting, are jointly counted/indexed across all the S>1 SSB/CSI-RS resource sets. For example, all the $L_s$ SSB/CSI-RS resources configured in the M=1 CSI resource setting, could be indexed as $\{\#1, \#2, \ldots, \#L_s\}$, i.e., SSB/CSI-RS #1, SSB/CSI-RS #2, ..., SSB/CSI-RS $\#L_s$. Hence, for the p-th (p=1, ..., S) SSB/CSI-RS resource set (e.g., with the p-th lowest/highest SSB/CSI-RS resource set ID, denoted by SSB-ResourceSetId/NZP-CSI-RS-ResourceSetId) comprising of $l_p$ SSB/CSI-RS resources, the SSB/CSI-RS resources therein could be indexed as $\{\#l_{p-1}+1, \#l_{p-1}+2, \ldots, \#l_{p-1}+l_p\}$, i.e., SSB/CSI-RS $\#l_{p-1}+1$, SSB/CSI-RS $\#l_{p-1}+2$, ..., SSB/CSI-RS $\#l_{p-1}+l_p$, and the corresponding SSBRIs/CRIs (if reported) are SSBRI/CRI $\#l_{p-1}+1$, SSBRI/CRI $\#l_{p-1}+2$, ..., SSBRI/CRI $l_{p-1}+l_p$. The UE may not need to indicate to the network which SSB/CSI-RS resource set(s) the reported SSBRIs/CRIs are associated with/from because the reported SSBRIs/CRIs are different for different SSB/CSI-RS resource sets. Other rules/configurations of jointly counting/indexing all the $L_s$ SSB/CSI-RS resources across all the S>1 SSB/CSI-RS resource sets are also possible.

In one example of Configuration-2.B.3, the UE could be indicated by the network the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the SSB/CSI-RS resource sets; this indication could be via higher layer (RRC) (e.g., via the higher layer parameter CSI-ReportConfig) or/and MAC CE or/and DCI based signaling or/and any combination of at least two of RRC, MAC CE and DCI based signaling; this indication could be via a separate (dedicated) parameter or joint with another parameter.

Alternatively, the UE could autonomously determine the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the SSB/CSI-RS resource sets. In this case, the UE may also indicate to the network their determined association rule(s)/mapping relationship(s).

For instance, the UE could be configured/indicated by the network to report in a single reporting instance a group of SSBRIs/CRIs for all the S>1 SSB/CSI-RS resource sets. The UE could be further configured/indicated by the network that the first SSBRI/CRI in the group may correspond to the first SSB/CSI-RS resource set (e.g., with the lowest SSB/CSI-RS resource set ID, denoted by SSB-ResourceSetId/NZP-CSI-RS-ResourceSetId), the second SSBRI/CRI in the group may correspond to the second SSB/CSI-RS resource set (e.g., with the second lowest SSB/CSI-RS resource subset ID, denoted by SSB-ResourceSetId/NZP-CSI-RS-ResourceSetId), and so on, and the last SSBRI/CRI in the group may correspond to the last/S-th SSB/CSI-RS resource set (e.g., with the highest SSB/CSI-RS resource subset ID, denoted by SSB-ResourceSetId/NZP-CSI-RS-ResourceSetId). The above described configuration method(s) can be applied to both SSB/CSI-RS resource counting/indexing methods in Configuration-2.B.1 and Configuration-2.B.2.

The UE could be higher layer configured (e.g., via higher layer RRC signaling) by the network the total number of SSB/CSI-RS resources $L_s$ across all S>1 SSB/CSI-RS resource sets configured in the CSI resource setting and/or the number of SSB/CSI-RS resources $l_p$ in the p-th SSB/CSI-RS resource set (e.g., with the p-th lowest/highest SSB/CSI-RS resource set ID, denoted by SSB-ResourceSetId/NZP-CSI-RS-ResourceSetId).

In one example of 2.C, SSB/CSI-RS resource counting rules/configurations for multiple CSI resource settings configured for multi-TRP operation are provided.

The UE could be higher layer configured by the network (e.g., via the higher layer parameter CSI-ResourceConfig) M>1 CSI resource settings for the multi-TRP operation with at least one (S=1) SSB/CSI-RS resource set per CSI resource setting, and each CSI resource setting is associated with/corresponds to a coordinating TRP in the multi-TRP system; the M>1 CSI resource settings configured for the multi-TRP operation could be denoted by the first CSI resource setting, the second CSI resource setting, ..., and the M-th CSI resource setting.

In one example of Configuration-2.C.1, the SSB/CSI-RS resources configured in the M>1 CSI resource settings, are independently/separately counted/indexed within each CSI resource setting. Consider the q-th (q=1, ..., M) CSI resource setting (e.g., with the q-th lowest/highest CSI resource setting ID, denoted by CSI-ResourceConfigId) comprising of $m_q$ SSB/CSI-RS resources. The $m_q$ SSB/CSI-RS resources in the q-th CSI resource setting are indexed as $\{\#1, \#2, \ldots, \#m_q\}$, i.e., SSB/CSI-RS #1, SSB/CSI-RS #2, ..., SSB/CSI-RS $\#m_q$, and the corresponding SSBRIs/CRIs (if reported) are SSBRI/CRI #1, SSBRI/CRI #2, ..., SSBRI/CRI $\#m_q$. Along with the report(s) of one or more SSBRIs/CRIs determined from the SSB/CSI-RS resources in one or more CSI resource settings, the UE could also indicate to the network which CSI resource setting(s) the reported SSBRIs/CRIs are associated with/from.

In one example, this indication could be the CSI resource setting ID, e.g., CSI-ResourceConfigId. In another example, this indication could be a flag indicator for M=2 with "1" indicating the first CSI resource setting and "0" indicating the second CSI resource setting. In yet another example, this indication could be a ceil(log 2(M))-bit indicator indicating any of the M>1 CSI resource settings. Other rules/configurations of independently/separately counting/indexing the SSB/CSI-RS resources within each CSI resource setting are also possible.

In one example of Configuration-2.C.2, the SSB/CSI-RS resources configured in the M>1 CSI resource settings, are jointly counted/indexed across all the M>1 CSI resource settings. For example, all the $L_m$ SSB/CSI-RS resources configured in the M>1 CSI resource settings, could be indexed as $\{\#1, \#2, \ldots, \#L_m\}$, i.e., SSB/CSI-RS #1, SSB/CSI-RS #2, ..., SSB/CSI-RS $\#L_m$. Hence, for the q-th (q=1, ..., M) CSI resource setting (e.g., with the q-th lowest/highest CSI resource setting ID, denoted by CSI-ResourceConfigId) comprising of $m_q$ SSB/CSI-RS resources, the SSB/CSI-RS resources therein could be indexed as $\{\#m_{q-1}+1, \#m_{q-1}+2, \ldots, \#m_{q-1}+m_q\}$, i.e., SSB/CSI-RS $\#m_{q-1}+1$, SSB/CSI-RS $\#m_{q-1}+2$, ..., SSB/CSI-RS $\#m_{q-1}+m_q$, and the corresponding SSBRIs/CRIs (if reported) are SSBRI/CRI $\#m_{q-1}+1$, SSBRI/CRI $\#m_{q-1}+2$, ..., SSBRI/CRI $\#m_{q-1}m_q$. The UE may not need to indicate to the network which CSI resource setting(s) the reported SSBRIs/CRIs are associated with/from because the reported SSBRIs/CRIs are different for different CSI resource settings. Other rules/configurations of jointly counting/indexing all the $L_m$ SSB/CSI-RS resources across all the M>1 CSI resource settings are also possible.

In one example of Configuration-2.C.3, the UE could be indicated by the network the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the CSI resource settings; this indication could be via higher layer (RRC) (e.g., via the higher layer parameter CSI-ReportConfig) or/and MAC CE or/and DCI based signaling or/and any combination of at least two of RRC, MAC CE and DCI based signaling; this indication could be via a separate (dedicated) parameter or joint with another parameter.

Alternatively, the UE could autonomously determine the association rule(s)/mapping relationship(s) between the time-frequency resource(s) (e.g., the periodicity, the subband(s)/PRB(s) and etc.) used for sending the resource indicator(s) such as SSBRI(s)/CRI(s) and the CSI resource settings. In this case, the UE may also indicate to the network their determined association rule(s)/mapping relationship(s).

For instance, the UE could be configured/indicated by the network to report in a single reporting instance a group of SSBRIs/CRIs for all the M>1 CSI resource settings. The UE could be further configured/indicated by the network that the first SSBRI/CRI in the group may correspond to the first CSI resource setting (e.g., with the lowest CSI resource setting ID, denoted by CSI-ResourceConfigId), the second SSBRI/CRI in the group may correspond to the second CSI resource setting (e.g., with the second lowest CSI resource setting ID, denoted by CSI-ResourceConfigId), and so on, and the last SSBRI/CRI in the group may correspond to the last/M-th CSI resource setting (e.g., with the highest CSI resource setting ID, denoted by CSI-ResourceConfigId). The above described configuration method(s) can be applied to both SSB/CSI-RS resource counting/indexing methods in Configuration-2.C.1 and Configuration-2.C.2.

The UE could be higher layer configured (e.g., via higher layer RRC signaling) by the network the total number of SSB/CSI-RS resources $L_m$ across all M>1 CSI resource settings and/or the number of SSB/CSI-RS resources $m_q$ in the q-th CSI resource setting (e.g., with the q-th lowest/highest CSI resource setting ID, denoted by CSI-ResourceConfigId).

The UE could be higher layer configured by the network one or more parameters for setting/configuring the SSB/CSI-RS resources (e.g., their periodicities, densities, slot offsets and etc.) in SSB/CSI-RS resource subset and/or SSB/CSI-RS resource set for beam measurement and reporting in a multi-TRP system. The corresponding configuration/indication methods are also specified.

In one embodiment of 3.A, parameters to configure SSB/CSI-RS resources in an SSB/CSI-RS resource subset are provided.

As discussed above, the UE could be higher layer configured by the network more than one SSB/CSI-RS resource subsets used for beam measurement and reporting in a multi-TRP system. Various parameters and the corresponding methods for configuring the SSB/CSI-RS resource(s) in the SSB/CSI-RS resource subset are provided.

In one example of 3.A.1, SSB/CSI-RS resource subset common parameters are provided. The SSB/CSI-RS resource subset could only contain the corresponding SSB/CSI-RS resource information, e.g., the SSB/CSI-RS resource index(s)/ID(s), while the SSB/CSI-RS resource set specific parameters such as periodicity, repetition and etc. are common for all SSB/CSI-RS resource subsets configured therein.

In one example of CSI-SSB-ResourceSubSet, in the higher layer parameter CSI-SSB-ResourceSet, a list of references to SSB resources used for beam measurement and reporting in a SSB resource subset (csi-SSB-ResourceSubSetList in TABLE 1) is configured. An information element (IE) CSI-SSB-ResourceSubSet is defined and used to configure one SSB resource subset which refers to SS/PBCH as indicated in the higher layer parameter ServingCellConfigCommon.

In TABLE 2, a snippet of the IE CSI-SSB-ResourceSubSet is provided with CSI-SSB-ResourceSubSetId used for identifying one SSB resource subset (see TABLE 3). As can be seen from TABLE 2, CSI-SSB-ResourceSubSet only contains the corresponding SSB resource index(s)/ID(s).

TABLE 1

An example of higher layer parameter CSI-SSB-ResourceSet

CSI-SSB-ResourceSet ::=  SEQUENCE {
   csi-SSB-ResourceSetId  CSI-SSB-ResourceSetId,
   csi-SSB-ResourceList  SEQUENCE (SIZE(1..maxNrofCSI-SSB-ResourcePerSet))
OF SSB-Index,
   csi-SSB-ResourceSubSetList  SEQUENCE (SIZE (1..maxNrofCSI-SSB-
ResourceSubSetsPerSub)) OF CSI-SSB-ResourceSubSetId OPTIONAL -- Need R
   . . .
}

TABLE 2

An example of higher layer parameter CSI-SSB-ResourceSubset

CSI-SSB-ResourceSubSet ::=  SEQUENCE {
   csi-SSB-ResourceSubSetId  CSI-SSB-ResourceSubSetId,
   csi-SSB-ResourceList  SEQUENCE (SIZE
                       (1..maxNrofCSI-SSB-
ResourcePerSubSet)) OF SSB-Index,
   . . .
}

TABLE 3

An example of CSI resource subset ID

CSI-SSB-ResourceSubSetId ::=  INTEGER (0..maxNrofCSI-SSB-ResourceSubSets-1)

Alternatively, in the higher layer parameters CSI-SSB-ResourceSet in TABLE 1 and/or CSI-SSB-ResourceSubSet in TABLE 2, explicit SSB resource information for each configured resource subset could be incorporated. In one example, the number of SSB resource(s) $k_r$ comprised in the r-th SSB resource subset could be indicated in CSI-SSB-ResourceSet and/or CSI-SSB-ResourceSubSet for all r=1, ..., $M_s$. In another example, the index(s)/ID(s) of the SSB resource(s) in each configured SSB resource subset could be indicated in CSI-SSB-ResourceSet (similar to TABLE 2).

In yet another example, for $M_s$=2 ($K_s$=$k_1$+$k_2$), a bitmap of length $K_s$ with each bit in the bitmap corresponding to a SSB resource in the SSB resource set could be incorporated in CSI-SSB-ResourceSet and/or CSI-SSB-ResourceSubSet; each bit in the bitmap could indicate whether the corresponding/associated SSB resource is in the first SSB resource subset (containing the $k_1$ SSB resources) or the second SSB resource subset (containing the $k_2$ SSB resources); e.g., a bit configured as "1" in the bitmap indicates that the corresponding/associated SSB resource is in the first SSB resource subset (containing the $k_1$ SSB resources), and a bit configured as "0" in the bitmap indicates that the corresponding/associated SSB resource is in the second SSB resource subset (containing the $k_2$ SSB resources).

In yet another example, $M_s$ bitmaps, each corresponding to/associated with a SSB resource subset, are incorporated in CSI-SSB-ResourceSet and/or CSI-SSB-ResourceSubSet; the r-th (r=1, ..., $M_s$) bitmap with length $K_s$ could correspond to the r-th (r=1, ..., $M_s$) SSB resource subset comprising of $k_r$ SSB resources; each bit in the r-th (r=1, ..., $M_s$) bitmap could indicate whether the corresponding/associated SSB resource is in the r-th SSB resource subset or not.

In one example of NZP-CSI-RS-ResourceSubSet, in the higher layer parameter NZP-CSI-RS-ResourceSet, a list of references to NZP CSI-RS resources used for beam measurement and reporting in a CSI-RS resource subset (nzp-CSI-RS-ResourceSubSetList in TABLE 4) is configured. An IE NZP-CSI-RS-ResourceSubSet is defined and used for configuring a set of NZP CSI-RS resources (their IDs), which could be a subset of those configured in NZP-CSI-RS-ResourceSet.

In TABLE 5, a snippet of the higher layer parameter NZP-CSI-RS-ResourceSubSet is given with NZP-CSI-RS-ResourceSubSetId used for identifying one NZP-CSI-RS-ResourceSubSet (see TABLE 6). As can be seen from TABLE 5, NZP-CSI-RS-ResourceSubSet only contains the corresponding NZP CSI-RS resource index(s)/ID(s).

TABLE 4

An example of higher layer parameter NZP-CSI-RS-ResourceSet

```
NZP-CSI-RS-ResourceSet ::=        SEQUENCE {
    nzp-CSI-ResourceSetId         NZP-CSI-RS-ResourceSetId,
    nzp-CSI-RS-Resources              SEQUENCE (SIZE (1..maxNrofNZP-CSI-RS-
ResourcesPerSet)) OF NZP-CSI-RS-ResourceId,
    repetition                    ENUMERATED { on, off }    OPTIONAL, -- Need S
    aperiodicTriggeringOffset     INTEGER(0..6)             OPTIONAL, -- Need S
    trs-Info                      ENUMERATED {true}         OPTIONAL, -- Need R
    ...,
    [[
    aperiodicTriggeringOffset-r16    INTEGER(0..31)         OPTIONAL -- Need S
    ]]
    nzp-CSI-RS-ResourceSubSetList SEQUENCE (SIZE (1..maxNrofNZP-CSI-RS-
ResourceSubSetsPerSet)) OF NZP-CSI-RS-ResourceSubSetId OPTIONAL, -- Need R
}
```

TABLE 5

An example of higher layer parameter NZP-CSI-RS-ResourceSubset

```
NZP-CSI-RS-ResourceSubSet ::=   SEQUENCE {
    nzp-CSI-ResourceSubSetId    NZP-CSI-RS-ResourceSubSetId,
    nzp-CSI-RS-Resources            SEQUENCE (SIZE (1..maxNrofNZP-CSI-RS-
ResourcesPerSubSet)) OF NZP-CSI-RS-ResourceId
}
```

TABLE 6

An example of CSI resource subset ID

NZP-CSI-RS-ResourceSubSetId ::= INTEGER (0..maxNrofNZP-CSI-RS-ResourceSubSets-1)

Alternatively, in the higher layer parameters NZP-CSI-RS-ResourceSet in TABLE 4 and/or NZP-CSI-RS-ResourceSubSet in TABLE 5, explicit NZP CSI-RS resource information for each configured resource subset could be incorporated. In one example, the number of NZP CSI-RS resource(s) $k_r$ comprised in the r-th CSI-RS resource subset could be indicated in NZP-CSI-RS-ResourceSet and/or NZP-CSI-RS-ResourceSubSet for all r=1, ..., $M_s$. In another example, the index(s)/ID(s) of the NZP CSI-RS resource(s) in each configured CSI-RS resource subset could be indicated in NZP-CSI-RS-ResourceSet (similar to TABLE 5).

In yet another example, for $M_s=2$ ($K_s=k_1+k_2$), a bitmap of length $K_s$ with each bit in the bitmap corresponding to a NZP CSI-RS resource in the CSI-RS resource set could be incorporated in NZP-CSI-RS-ResourceSet and/or NZP-CSI-RS-ResourceSubSet; each bit in the bitmap could indicate whether the corresponding/associated NZP CSI-RS resource is in the first CSI-RS resource subset (containing the $k_1$ NZP CSI-RS resources) or the second CSI-RS resource subset (containing the $k_2$ NZP CSI-RS resources); e.g., a bit configured as "1" in the bitmap indicates that the corresponding/associated NZP CSI-RS resource is in the first CSI-RS resource subset (containing the $k_1$ NZP CSI-RS resources), and a bit configured as "0" in the bitmap indicates that the corresponding/associated NZP CSI-RS resource is in the second CSI-RS resource subset (containing the $k_2$ NZP CSI-RS resources).

In yet another example, $M_s$ bitmaps, each corresponding to/associated with a CSI-RS resource subset, are incorporated in NZP-CSI-RS-ResourceSet and/or NZP-CSI-RS-ResourceSubSet; the r-th ($r=1, \ldots, M_s$) bitmap with length $K_s$ could correspond to the r-th ($r=1, \ldots, M_s$) CSI-RS resource subset comprising of $k_r$ NZP CSI-RS resources; each bit in the r-th ($r=1, \ldots, M_s$) bitmap could indicate whether the corresponding/associated NZP CSI-RS resource is in the r-th CSI-RS resource subset or not.

TABLE 7

An example of higher layer parameter NZP-CSI-RS-Resource

```
NZP-CSI-RS-Resource ::=    SEQUENCE {
   nzp-CSI-RS-ResourceId      NZP-CSI-RS-ResourceId,
   resourceMapping            CSI-RS-ResourceMapping,
   powerControlOffset         INTEGER (–8..15),
   powerControlOffsetSS       ENUMERATED{db-3, db0, db3, db6}     OPTIONAL,
-- Need R
   scramblingID               ScramblingId,
   periodicityAndOffset       CSI-ResourcePeriodicityAndOffset    OPTIONAL, -
- Cond PeriodicOrSemiPersistent
   qcl-InfoPeriodicCSI-RS     TCI-StateId                         OPTIONAL, -- Cond
Periodic
   ...
}
```

The set specific parameters such as repetition, aperiodic-TriggeringOffset/aperiodicTriggeringOffset-r16 and trs-Info in NZP-CSI-RS-ResourceSet in TABLE 4 are common for all the $M_s>1$ CSI-RS resource subsets configured in the CSI-RS resource set. Parameters for configuring the NZP CSI-RS resource(s) in a CSI-RS resource subset (nzp-CSI-RS-Resources in NZP-CSI-RS-ResourceSubSet shown in TABLE 5) are given in TABLE 7. The CSI-RS resources within the CSI-RS resource set, i.e., in all the configured $M_s>1$ CSI-RS resource subsets, have the same periodicity-AndOffset, same density in resourceMapping and same nrofPorts in resourceMapping. The CSI-RS resources within the CSI-RS resource set, i.e., within all the configured $M_s>1$ CSI-RS resource subsets, are configured with the same starting RB and number of RBs and the same cdm-type in resourceMapping.

In one example of 3.A.2, SSB/CSI-RS resource subset specific parameters are provided.

The CSI-RS resource subset could not only contain the corresponding CSI-RS resource information, e.g., the CSI-RS resource index(s)/ID(s), but also the parameters such as periodicity, repetition and etc., which could be separately configured for each CSI-RS resource subset (i.e., CSI-RS resource subset specific parameter(s)).

In one example of CSI-SSB-ResourceSubSet, in the higher layer parameter CSI-SSB-ResourceSet, a list of references to SSB resources used for beam measurement and reporting in a SSB resource subset (csi-SSB-ResourceSubSetList in TABLE 1) is configured. An information element (IE) CSI-SSB-ResourceSubSet is defined and used to configure one SSB resource subset which refers to SS/PBCH as indicated in the higher layer parameter ServingCellConfigCommon.

In TABLE 2, a snippet of the IE CSI-SSB-ResourceSubSet is provided with CSI-SSB-ResourceSubSetId used for identifying one SSB resource subset (see TABLE 3). As can be seen from TABLE 2, CSI-SSB-ResourceSubSet only contains the corresponding SSB resource index(s)/ID(s).

Alternatively, in the higher layer parameters CSI-SSB-ResourceSet in TABLE 1 and/or CSI-SSB-ResourceSubSet in TABLE 2, explicit SSB resource information for each configured resource subset could be incorporated. In one example, the number of SSB resource(s) $k_r$ comprised in the r-th SSB resource subset could be indicated in CSI-SSB-ResourceSet and/or CSI-SSB-ResourceSubSet for all $r=1, \ldots, M_s$. In another example, the index(s)/ID(s) of the SSB resource(s) in each configured SSB resource subset could be indicated in CSI-SSB-ResourceSet (similar to TABLE 2).

In yet another example, for $M_s=2$ ($K_s=k_1+k_2$), a bitmap of length $K_s$ with each bit in the bitmap corresponding to a SSB resource in the SSB resource set could be incorporated in CSI-SSB-ResourceSet and/or CSI-SSB-ResourceSubSet; each bit in the bitmap could indicate whether the corresponding/associated SSB resource is in the first SSB resource subset (containing the $k_1$ SSB resources) or the second SSB resource subset (containing the $k_2$ SSB resources); e.g., a bit configured as "1" in the bitmap indicates that the corresponding/associated SSB resource is in the first SSB resource subset (containing the $k_1$ SSB resources), and a bit configured as "0" in the bitmap indicates that the corresponding/associated SSB resource is in the second SSB resource subset (containing the $k_2$ SSB resources).

In yet another example, $M_s$ bitmaps, each corresponding to/associated with a SSB resource subset, are incorporated in CSI-SSB-ResourceSet and/or CSI-SSB-ResourceSubSet; the r-th ($r=1, \ldots, M_s$) bitmap with length $K_s$ could correspond to the r-th ($r=1, \ldots, M_s$) SSB resource subset comprising of $k_r$ SSB resources; each bit in the r-th ($r=1, \ldots, M_s$) bitmap could indicate whether the corresponding/associated SSB resource is in the r-th SSB resource subset or not.

In one example of NZP-CSI-RS-ResourceSubSet, in the higher layer parameter NZP-CSI-RS-ResourceSet, a list of references to NZP CSI-RS resources used for beam measurement and reporting in a CSI-RS resource subset (nzp-CSI-RS-ResourceSubSetList in TABLE 4) is configured. An IE NZP-CSI-RS-ResourceSubSet is defined and used for configuring a set of NZP CSI-RS resources (their IDs), which could be a subset of those configured in NZP-CSI-RS-ResourceSet, and a set of parameters, which could be separately configured from those configured in NZP-CSI-RS-ResourceSet.

TABLE 8

An example of higher layer parameter NZP-CSI-RS-ResourceSubSet

```
NZP-CSI-RS-ResourceSubSet ::=     SEQUENCE {
   nzp-CSI-ResourceSubSetId       NZP-CSI-RS-ResourceSubSetId,
   nzp-CSI-RS-Resources           SEQUENCE (SIZE (1..maxNrofNZP-CSI-RS-
ResourcesPerSubSet)) OF NZP-CSI-RS-ResourceId,
   repetition-subset      ENUMERATED { on, off }      OPTIONAL, -- Need S
   aperiodicTriggeringOffset-subset INTEGER(0..6)      OPTIONAL, -- Need S
   trs-Info-subset    ENUMERATED {true}            OPTIONAL, -- Need R
   ...,
   [[
   aperiodicTriggeringOffset-r16-subset INTEGER(0..31)     OPTIONAL -- Need
S
   ]]
}
```

In TABLE 8, a snippet of the higher layer parameter NZP-CSI-RS-ResourceSubSet is given with NZP-CSI-RS-ResourceSubSetId used for identifying one NZP-CSI-RS-ResourceSubset (see TABLE 6). Other parameters that could be configured in NZP-CSI-RS-ResourceSubSet are illustrated as follows.

In one example of Parameter-1 (repetition-subset), a repetition-subset in NZP-CSI-RS-ResourceSubSet is associated with a CSI-RS resource subset and defines whether a UE can assume the CSI-RS resources within the NZP CSI-RS resource subset are transmitted with the same downlink spatial domain transmission filter or not. More specifically, if a UE is configured with an NZP-CSI-RS-ResourceSubSet configured with the higher layer parameter repetition-subset set to "on," the UE may assume that the CSI-RS resources within the NZP-CSI-RS-ResourceSubSet are transmitted with the same downlink spatial domain transmission filter, where the CSI-RS resources in the NZP-CSI-RS-ResourceSubSet are transmitted in different OFDM symbols.

If repetition is set to "off," the UE may not assume that the CSI-RS resources within the NZP-CSI-RS-ResourceSubSet are transmitted with the same downlink spatial domain transmission filter. Furthermore, repetition-subset in NZP-CSI-RS-ResourceSubSet can be configured only when the higher layer parameter reportQuantity associated with all the reporting settings linked with the CSI-RS resource subset is set to "cri-RSRP," "cri-SINR" or "none." Additional details about the association between the CSI-RS resource subsets and the reporting setting(s) may be found in U.S. patent application Ser. No. 17/452,981 filed on Oct. 29, 2021, U.S. patent application Ser. No. 17/654,749 filed on Mar. 14, 2022, and U.S. patent application Ser. No. 17/657,686 filed on Apr. 1, 2022, each of which are incorporated by reference herein.

In one example of Parameter-2 (aperiodicTriggeringOffset-subset), indicating an offset X between the slot containing the DCI that triggers a set of aperiodic NZP CSI-RS resources and the slot in which the CSI-RS resource subset is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots.

In one example of Parameter-3 (aperiodicTriggeringOffset-r16-subset), indicating an offset X between the slot containing the DCI that triggers a set of aperiodic NZP CSI-RS resources and the slot in which the CSI-RS resource subset is transmitted. The value indicates the number of slots. The network configures only one of Parameter-2 (aperiodicTriggeringOffset-subset) and Parameter-3 (aperiodicTriggeringOffset-r16-subset). When neither Parameter-2 (aperiodicTriggeringOffset-subset) nor Parameter-3 (aperiodicTriggeringOffset-r16-subset) is included, the UE applies the value 0.

In one example of Parameter-4 (trs-Info-subset), trs-Info-subset is associated with a CSI-RS resource subset and for which the UE can assume that the antenna port with the same port index of the configured NZP CSI-RS resources in the NZP-CSI-RS-ResourceSubSet is the same as described in Clause 5.1.6.1.1 in the 3GPP TS 38.214 (on a per CSI-RS resource subset basis) and can be configured when reporting setting is not configured or when the higher layer parameter reportQuantity associated with all the reporting settings linked with the CSI-RS resource subset is set to "none." Additional details about the association between the CSI-RS resource subsets and the reporting setting(s) may be found in U.S. patent application Ser. No. 17/452,981 filed on Oct. 29, 2021, U.S. patent application Ser. No. 17/654,749 filed on Mar. 14, 2022, and U.S. patent application Ser. No. 17/657, 686 filed on Apr. 1, 2022.

In one example of Parameter-5 (nzp-CSI-RS-Resources), parameters for configuring the NZP CSI-RS resource(s) in a CSI-RS resource subset (nzp-CSI-RS-Resources in NZP-CSI-RS-ResourceSubSet shown in TABLE 8) are given in TABLE 7. The CSI-RS resources configured in different CSI-RS resource subsets in the CSI-RS resource set, could have the same or different periodicityAndOffset, the same or different density in resourceMapping and the same or different nrofPorts in resourceMapping. The CSI-RS resources configured in different CSI-RS resource subsets in the CSI-RS resource set, could be configured with the same or different starting RBs, the same or different numbers of RBs and the same or different cdm-type in resourceMapping.

One or more of Parameter-1, Parameter-2, Parameter-3, Parameter-4 and Parameter-5 could be configured in NZP-CSI-RS-ResourceSubSet for a CSI-RS resource subset. For instance, only Parameter-1 (repetition-subset) and Parameter-4 (trs-Info-subset) could be configured in NZP-CSI-RS-ResourceSubSet for a CSI-RS resource set. In this case, other parameters for configuring the NZP CSI-RS resource (s) in the CSI-RS resource subset could follow those configured in the corresponding CSI-RS resource set.

For another example, only Parameter-5 (nzp-CSI-RS-Resources) could be configured in NZP-CSI-RS-ResourceSubSet for a CSI-RS resource set, while other parameters for configuring the NZP CSI-RS resource(s) (i.e., Parameter-1, Parameter-2, Parameter-3 and Parameter-4) in the CSI-RS resource subset could follow those configured in the corresponding CSI-RS resource set. Alternatively, one or more lists of parameters of Parameter-1, Parameter-2, Parameter-3, Parameter-4 and/or Parameter-5 could be configured in NZP-CSI-RS-ResourceSet for the CSI-RS resource set.

For instance, a list of parameters to indicate whether the same downlink spatial domain transmission filter is applied for transmitting the NZP CSI-RS resource(s) in each of the CSI-RS resource subsets (e.g., a list of Parameter-1 repetition-subset's) could be incorporated in NZP-CSI-RS-ResourceSet. Each repetition-subset parameter in the list could correspond to a CSI-RS resource subset. For a total of $M_s>1$ CSI-RS resource subsets configured in the CSI-RS resource set, the list could contain $M_s>1$ repetition-subset parameters. For instance, the first repetition-subset parameter in the list could correspond to the first CSI-RS resource subset (e.g., with the lowest NZP-CSI-RS-ResourceSubSetId), the second repetition-subset parameter in the list could correspond to the second CSI-RS resource subset (e.g., with the second lowest NZP-CSI-RS-ResourceSubSetId), and so on, and the last/$M_s$-th repetition-subset parameter in the list could correspond to the last/$M_s$-th CSI-RS resource subset (e.g., with the highest NZP-CSI-RS-ResourceSubSetId).

Other association rules/mapping relationships between the entries in the list of repetition-subset parameters and the $M_s>1$ CSI-RS resource subsets in the CSI-RS resource set are also possible. The configuration methods for other lists of parameters of Parameter-2, Parameter-3, Parameter-4 and/or Parameter-5 (if configured) could follow those described for the list of parameters of Parameter-1.

If the same parameter(s) is configured in a CSI-RS resource subset (e.g., via NZP-CSI-RS-ResourceSubSet) and the corresponding CSI-RS resource set (e.g., via NZP-CSI-RS-ResourceSet)—e.g., both trs-Info-subset is configured in NZP-CSI-RS-ResourceSubSet for a CSI-RS resource subset and trs-Info is configured in NZP-CSI-RS-ResourceSet for the corresponding CSI-RS-ResourceSet, In one example, the UE would follow the parameter(s) configured in the NZP-CSI-RS-ResourceSet for the NZP CSI-RS resource(s) configured in the NZP-CSI-RS-ResourceSubSet (i.e., in the corresponding CSI-RS resource subset) regardless how the counterpart parameter(s) is configured in the NZP-CSI-RS-ResourceSubSet. For instance, if repetition in the higher layer parameter NZP-CSI-RS-ResourceSet is set to "on" while repetition-subset in NZP-CSI-RS-ResourceSubSet for a CSI-RS resource subset is set to "off," the UE can assume that the NZP CSI-RS resources within the CSI-RS resource subset are transmitted with the same downlink spatial domain transmission filter.

In another example, the UE would follow the parameter(s) configured in the NZP-CSI-RS-ResourceSubSet for the NZP CSI-RS resource(s) configured therein (i.e., in the corresponding NZP CSI-RS resource subset) regardless how the counterpart parameter(s) is configured in the NZP-CSI-RS-ResourceSet. For instance, if repetition in the higher layer parameter NZP-CSI-RS-ResourceSet is set to "on" while repetition-subset in NZP-CSI-RS-ResourceSubSet for a CSI-RS resource subset is set to "off," the UE would not assume that the NZP CSI-RS resources within the CSI-RS resource subset are transmitted with the same downlink spatial domain transmission filter.

In yet another example, the UE could be indicated by the network to follow the parameter(s) configured in either the NZP-CSI-RS-ResourceSet or the CSI-RS-ResourceSubSet for the NZP CSI-RS resource(s) configured in the NZP-CSI-RS-ResourceSubSet (i.e., in the corresponding CSI-RS resource subset).

In one embodiment of 3.B, parameters to configure SSB/CSI-RS resources in an SSB/CSI-RS resources set are provided.

TABLE 9

An example of higher layer parameter CSI-ResourceConfig

```
CSI-ResourceConfig ::=            SEQUENCE {
    csi-ResourceConfigId             CSI-ResourceConfigId,
    csi-RS-ResourceSetList           CHOICE {
        nzp-CSI-RS-SSB                 SEQUENCE {
            nzp-CSI-RS-ResourceSetList          SEQUENCE (SIZE (1..maxNrofNZP-CSI-RS-
ResourceSetsPerConfig)) OF NZP-CSI-RS-ResourceSetId     OPTIONAL, -- Need R
            csi-SSB-ResourceSetList             SEQUENCE (SIZE (1..maxNrofCSI-SSB-
ResourceSetsPerConfig)) OF CSI-SSB-ResourceSetId        OPTIONAL -- Need R
        },
        csi-IM-ResourceSetList              SEQUENCE (SIZE (1..maxNrofCSI-IM-
ResourceSetsPerConfig)) OF CSI-IM-ResourceSetId
    },
    bwp-Id      BWP-Id,
    resourceType    ENUMERATED { aperiodic, semiPersistent, periodic },
    ...
}
```

As discussed above, the UE could be higher layer configured by the network more than one CSI-RS resource sets in a CSI resource setting used for beam measurement and reporting in a multi-TRP system. Various parameters and the corresponding methods for configuring the SSB/CSI-RS resource(s) in the SSB/CSI-RS resource set are provided. In TABLE 9, a snippet of the higher layer parameter CSI-ResourceConfig is provided. As shown in TABLE 9, the parameter resourceType indicates the time domain behavior (periodic, semi-persistent or aperiodic) of all the NZP CSI-RS resource(s) (and therefore, all the corresponding NZP CSI-RS resource set(s)) configured in the CSI resource setting. Note that the parameter resourceType does not apply to the SSB resource(s) configured in the CSI resource setting.

TABLE 10

An example of higher layer parameter NZP-CSI-RS-ResourceSet

```
NZP-CSI-RS-ResourceSet ::=      SEQUENCE {
   nzp-CSI-ResourceSetId        NZP-CSI-RS-ResourceSetId,
   nzp-CSI-RS-Resources         SEQUENCE (SIZE (1..maxNrofNZP-CSI-RS-
ResourcesPerSet)) OF NZP-CSI-RS-ResourceId,
   repetition    ENUMERATED { on, off }       OPTIONAL, -- Need S
   aperiodicTriggeringOffset    INTEGER(0..6)     OPTIONAL, -- Need S
   trs-Info    ENUMERATED {true}              OPTIONAL, -- Need R
    ... ,
   [[
   aperiodicTriggeringOffset-r16   INTEGER(0..31)     OPTIONAL -- Need S
     ]]
      resourceType-set   ENUMERATED { aperiodic, semiPersistent, periodic },
}
```

A parameter resourceType-set could be incorporated in the higher layer parameter NZP-CSI-RS-ResourceSet for each of the S>1 CSI-RS resource sets configured in the CSI resource setting for beam measurement/reporting for the multi-TRP operation. A design example of the higher layer parameter NZP-CSI-RS-ResourceSet is given in TABLE 10. The parameter resourceType-set indicates the time domain behavior (periodic, semi-persistent or aperiodic) of all the NZP CSI-RS resource(s) configured in the corresponding CSI-RS resource set. That is, the time domain behaviors of the NZP CSI-RS resources configured in different CSI-RS resource sets in the same CSI resource setting could be different. If resourceType-set is not configured in NZP-CSI-RS-ResourceSet for a CSI-RS resource set, the time domain behavior of the NZP CSI-RS resource(s) configured in the CSI-RS resource set could follow the parameter resourceType configured in CSI-ResourceConfig for the corresponding CSI resource setting.

Alternatively, a list of parameters to indicate the time domain behavior(s) of the NZP CSI-RS resource(s) in the CSI-RS resource sets (e.g., a list of resourceType-set's) could be incorporated in CSI-ResourceConfig. Each resourceType-set parameter in the list could correspond to a CSI-RS resource set. For a total of S>1 CSI-RS resource sets configured in the CSI resource setting, the list could contain S>1 resourceType-set parameters. For instance, the first resourceType-set parameter in the list could correspond to the first CSI-RS resource set (e.g., with the lowest NZP-CSI-RS-ResourceSetId), the second resourceType-set parameter in the list could correspond to the second CSI-RS resource set (e.g., with the second lowest NZP-CSI-RS-ResourceSetId), and so on, and the last/S-th resourceType-set parameter in the list could correspond to the last/S-th CSI-RS resource set (e.g., with the highest NZP-CSI-RS-ResourceSetId). Other association rules/mapping relationships between the entries in the list of resourceType-set parameters and the S>1 CSI-RS resource sets in the CSI resource setting are also possible.

If both resourceType is configured in CSI-ResourceConfig for the CSI resource setting and resourceType-set is configured in NZP-CSI-RS-ResourceSet for a CSI-RS resource set: (1) in one example, the UE would follow resourceType configured in the CSI-ResourceConfig for the CSI resource setting regardless how resourceType-set is configured in the NZP-CSI-RS-ResourceSet for the CSI-RS resource set; (2) in another example, the UE would follow resourceType-set configured in the NZP-CSI-RS-ResourceSet for the CSI-RS resource set regardless how resourceType is configured in the CSI-ResourceConfig for the CSI resource setting; and (3) in yet another example, the UE could be indicated by the network to follow either resourceType configured in the CSI-ResourceConfig for the CSI resource setting or resourceType-set configured in NZP-CSI-RS-ResourceSet for the CSI-RS resource set.

As discussed above, two CSI resource sets (e.g., provided by CSI-SSB-ResourceSet or NZP-CSI-RS-ResourceSet)—denoted by a first CSI resource set and a second CSI resource set—can be configured in a CSI resource setting if group-based beam reporting for multi-TRP, e.g., higher layer parameter groupBasedBeamReporting-r17, is enabled/configured. For example, the higher layer parameter repetition can be set to the same value for both of the CSI resource sets. For another example, the higher layer parameter repetition can be set to different values respectively for the two CSI resource sets.

In one example, when the higher layer parameter groupBasedBeamReporting-r17 is configured or is set to 'enabled', if the higher layer parameter repetition is set to 'off' for both of the CSI resource sets, or if the higher layer parameter repetition is set to 'on' for both of the CSI resource sets, the UE could report in a single CSI reporting instance/CSI report K (e.g., K=1, 2, 4, 8, 16) groups of resource indicators such as SSBRIs/CRIs with each of the K groups of resource indicators including two resource indicators; the first resource indicator in each group of resource indicators is determined/selected from the first or second CSI resource set indicated by a resource set indicator (e.g., with '0' indicating the first CSI resource set and '1' indicating the second CSI resource set) reported in the same CSI reporting instance/CSI report, and the second resource indicator in each group of resource indicators is determined/selected from a different CSI resource set from that indicated by the resource set indicator.

TABLE 11

Mapping order of CSI fields of a first CSI report format for group-based beam reporting for multi-TRP

| CSI report number | CSI fields |
|---|---|
| CSI report #n | Resource set indicator<br>CRI or SSBRI #1 of 1st resource group<br>CRI or SSBRI #2 of 1st resource group<br>CRI or SSBRI #1 of 2nd resource group, if reported<br>CRI or SSBRI #2 of 2nd resource group, if reported<br>CRI or SSBRI #1 of 3rd resource group, if reported<br>CRI or SSBRI #2 of 3rd resource group, if reported<br>CRI or SSBRI #1 of 4th resource group, if reported<br>CRI or SSBRI #2 of 4th resource group, if reported<br>RSRP of CRI or SSBRI #1 of 1st resource group |

TABLE 11-continued

Mapping order of CSI fields of a first CSI report
format for group-based beam reporting for multi-TRP

| CSI report number | CSI fields |
|---|---|
| | Differential RSRP of CRI or SSBRI #2 of 1st resource group |
| | Differential RSRP of CRI or SSBRI #1 of 2nd resource group, if reported |
| | Differential RSRP of CRI or SSBRI #2 of 2nd resource group, if reported |
| | Differential RSRP of CRI or SSBRI #1 of 3rd resource group, if reported |
| | Differential RSRP of CRI or SSBRI #2 of 3rd resource group, if reported |
| | Differential RSRP of CRI or SSBRI #1 of 4th resource group, if reported |
| | Differential RSRP of CRI or SSBRI #2 of 4th resource group, if reported |

Furthermore, in the same CSI reporting instance/CSI report, the UE could also report K groups of beam metrics such as L1-RSRPs associated with the reported K groups of resource indicators respectively. Each of the K groups of beam metrics including two beam metrics, wherein a first beam metric in a first group of the K groups of beam metrics is a L1-RSRP, quantized to a 7-bit value in a range [−140, −44] dBm with a 1 dB step size, and remaining beam metrics in the K groups of beam metrics are L1-RSRPs, quantized to 4-bit values in the range [−140, −44] dBm with a 2 dB step size with a reference to the first beam metric in the first group of beam metrics. In TABLE 11, a first CSI report format (with K=4) as discussed above is provided.

Figure 9:
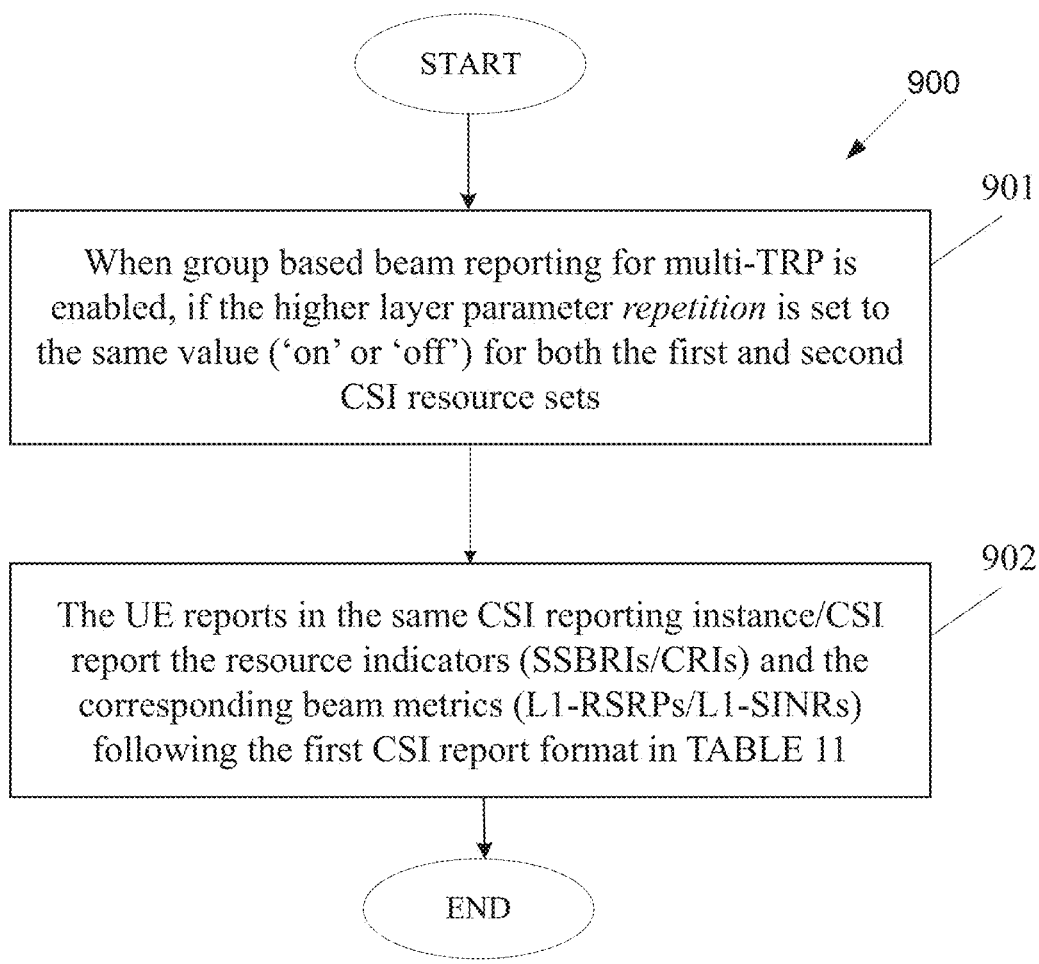
FIG. 9 illustrates an example of determining CSI report format according to embodiments of the present disclosure.

FIG. 9 illustrates an example of a process 900 for determining CSI report format according to embodiments of the present disclosure. For example, the process 900 may be performed by a UE, such as UE 116 in FIG. 1, and/or a BS, such as BS 102 in FIG. 1. An embodiment of the process 900 for determining the CSI report format shown in FIG. 9 is for illustration only.

In FIG. 9, a flowchart illustrating the above-described UE reporting behavior/procedure is presented.

In 901, the higher layer parameter repetition is set to the same value ('on' or 'off') for both the first and second CSI resource sets in the CSI resource setting (when the group-based beam reporting for multi-TRP, e.g., the higher layer parameter groupBasedBeamReporting-r17, is configured or is set to 'enabled').

In 902, the UE reports in the same CSI reporting instance/CSI report the resource indicators such as SSBRIs/CRIs and the corresponding beam metrics such as L1-RSRPs/L1-SINRs following the first CSI report format given in TABLE 11.

In another example, when the higher layer parameter groupBasedBeamReporting-r17 is configured or is set to 'enabled', if the higher layer parameter repetition is set to 'off' (or 'on') for the first CSI resource set, and if the higher layer parameter repetition is set to 'on' (or 'off') for the second CSI resource set, the UE could report in a single CSI reporting instance/CSI report K (e.g., K=1, 2, 4, 8, 16) resource indicators such as SSBRIs/CRIs, which are determined/selected from the CSI resource set configured with repetition 'off' (or 'on').

Furthermore, in the same CSI reporting instance/CSI report, the UE could also report K beam metrics such as L1-RSRPs associated with the reported K resource indicators respectively. A first beam metric in the set of K beam metrics is a L1-RSRP, quantized to a 7-bit value in a range [−140, −44] dBm with a 1 dB step size, and remaining (K−1) beam metrics in the set of K beam metrics are L1-RSRPs, quantized to 4-bit values in the range [−140, −44] dBm with a 2 dB step size with a reference to the first beam metric. The UE could report in the same CSI reporting instance/CSI report a resource set indicator with '0' indicating the first CSI resources set and '1' indicating the second CSI resource set. In TABLE 12, a second CSI report format (with K=4) as discussed above is provided. In TABLE 13, a third CSI report format (with K=4) as discussed above is provided. In TABLE 14, a fourth CSI report format (with K=4) as discussed above is provided.

TABLE 12

Mapping order of CSI fields of a second CSI report
format for group-based beam reporting for multi-TRP

| CSI report number | CSI fields |
|---|---|
| CSI report #n | Resource set indicator |
| | CRI or SSBRI #1 |
| | CRI or SSBRI #2, if reported |
| | CRI or SSBRI #3, if reported |
| | CRI or SSBRI #4, if reported |
| | RSRP of CRI or SSBRI #1 |
| | Differential RSRP of CRI or SSBRI #2, if reported |
| | Differential RSRP of CRI or SSBRI #3, if reported |
| | Differential RSRP of CRI or SSBRI #4, if reported |

TABLE 13

Mapping order of CSI fields of a third CSI report
format for group-based beam reporting for multi-TRP

| CSI report number | CSI fields |
|---|---|
| CSI report #n | Resource set indicator |
| | CRI or SSBRI #1 of 1st resource group, if reported |
| | CRI or SSBRI #2 of 1st resource group, if reported |
| | CRI or SSBRI #1 of 2nd resource group, if reported |
| | CRI or SSBRI #2 of 2nd resource group, if reported |
| | CRI or SSBRI #1 of 3rd resource group, if reported |
| | CRI or SSBRI #2 of 3rd resource group, if reported |
| | CRI or SSBRI #1 of 4th resource group, if reported |
| | CRI or SSBRI #2 of 4th resource group, if reported |
| | RSRP of CRI or SSBRI #1 of 1st resource group, if reported |
| | Differential RSRP of CRI or SSBRI #2 of 1st resource group, if reported |
| | Differential RSRP of CRI or SSBRI #1 of 2nd resource group, if reported |
| | Differential RSRP of CRI or SSBRI #2 of 2nd resource group, if reported |
| | Differential RSRP of CRI or SSBRI #1 of 3rd resource group, if reported |
| | Differential RSRP of CRI or SSBRI #2 of 3rd resource group, if reported |
| | Differential RSRP of CRI or SSBRI #1 of 4th resource group, if reported |
| | Differential RSRP of CRI or SSBRI #2 of 4th resource group, if reported |

TABLE 14

Mapping order of CSI fields of a fourth CSI report
format for group-based beam reporting for multi-TRP

| CSI report number | CSI fields |
|---|---|
| CSI report #n | Resource set indicator, if reported |
| | CRI or SSBRI #1 of 1st resource group, if reported |
| | CRI or SSBRI #2 of 1st resource group, if reported |
| | CRI or SSBRI #1 of 2nd resource group, if reported |
| | CRI or SSBRI #2 of 2nd resource group, if reported |
| | CRI or SSBRI #1 of 3rd resource group, if reported |
| | CRI or SSBRI #2 of 3rd resource group, if reported |
| | CRI or SSBRI #1 of 4th resource group, if reported |
| | CRI or SSBRI #2 of 4th resource group, if reported |
| | RSRP of CRI or SSBRI #1 of 1st resource group, if reported |
| | Differential RSRP of CRI or SSBRI #2 of 1st resource group, if reported |
| | Differential RSRP of CRI or SSBRI #1 of 2nd resource group, if reported |
| | Differential RSRP of CRI or SSBRI #2 of 2nd resource group, if reported |
| | Differential RSRP of CRI or SSBRI #1 of 3rd resource group, if reported |
| | Differential RSRP of CRI or SSBRI #2 of 3rd resource group, if reported |
| | Differential RSRP of CRI or SSBRI #1 of 4th resource group, if reported |
| | Differential RSRP of CRI or SSBRI #2 of 4th resource group, if reported |

In TABLE 13 and TABLE 14, the first resource indicator in each group of resource indicators could be determined/selected the CSI resource set configured with repetition 'on' (or 'off'), and the second resource indicator in each group of resource indicators could be determined/selected from the CSI resource set configured with repetition 'off' (or 'on').

Figure 10:
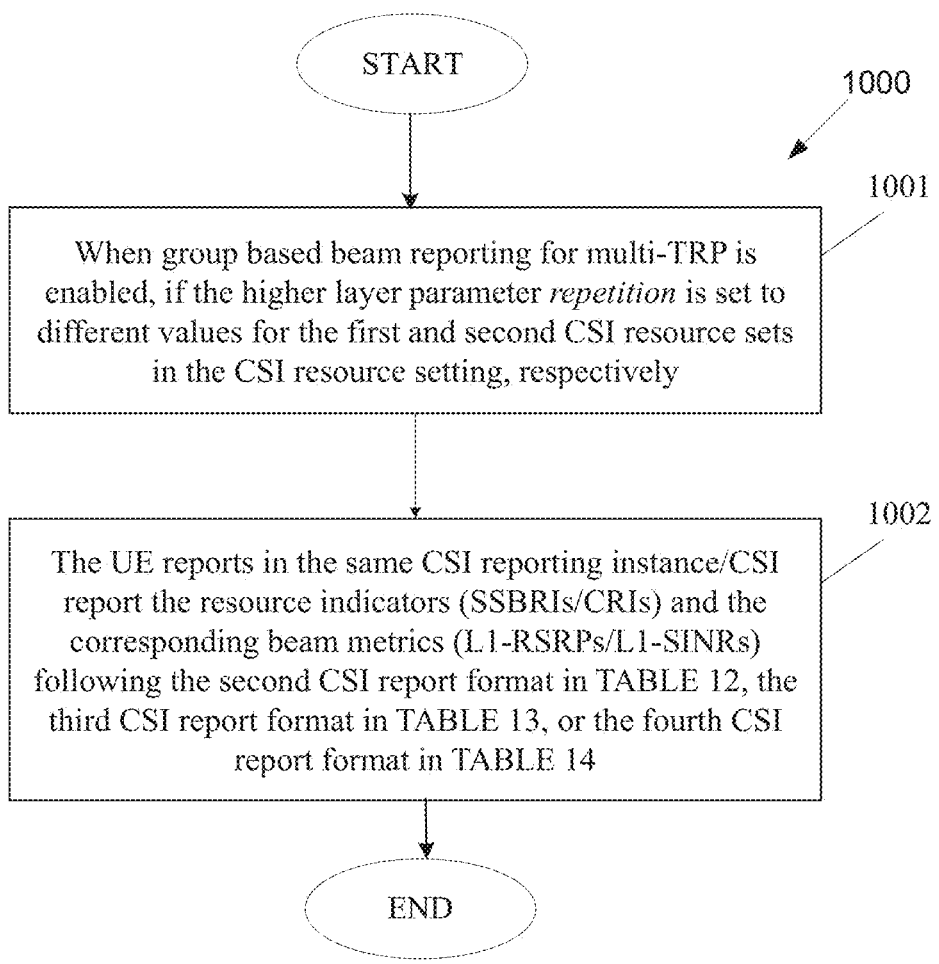
FIG. 10 illustrates another example of determining CSI report format according to embodiments of the present disclosure.

FIG. 10 illustrates another example of a process 1000 for determining a CSI report format according to embodiments of the present disclosure. For example, the process 1000 may be performed by a UE, such as UE 116 in FIG. 1, and/or a BS, such as BS 102 in FIG. 1. An embodiment of the process 1000 determining the CSI report format shown in FIG. 10 is for illustration only.

In FIG. 10, a flowchart illustrating the above-described UE reporting behavior/procedure is presented.

In 1001, the higher layer parameter repetition is set to different values for the first and second CSI resource sets in the CSI resource setting, respectively (when the group-based beam reporting for multi-TRP, e.g., the higher layer parameter groupBasedBeamReporting-r17, is configured or is set to 'enabled').

In 1002, the UE could report in the same CSI reporting instance/CSI report the resource indicators such as SSBRIs/CRIs and the corresponding beam metrics such as L1-RSRPs/L1-SINRs following the second CSI report format given in TABLE 12, the third CSI report format given in TABLE 13, or the fourth CSI report format given in TABLE 14.

In yet another example, when the higher layer parameter groupBasedBeamReporting-r17 is configured or is set to 'enabled', if the higher layer parameter repetition is set to 'off' (or 'on') for the first CSI resource set, and if the higher layer parameter repetition is set to 'on' (or 'off') for the second CSI resource set, and if the number of CSI resources in the first CSI resource set is configured as one, and if the number of CSI resources in the second CSI resource set is configured as one, the UE could report in a single CSI reporting instance/CSI report K (e.g., K=1, 2, 4, 8, 16) groups of resource indicators such as SSBRIs/CRIs with each of the K groups of resource indicators including two resource indicators; the first resource indicator in each group of resource indicators is determined/selected from the first or second CSI resource set indicated by a resource set indicator (e.g., with '0' indicating the first CSI resource set and '1' indicating the second CSI resource set) reported in the same CSI reporting instance/CSI report, and the second resource indicator in each group of resource indicators is determined/selected from a different CSI resource set from that indicated by the resource set indicator.

Furthermore, in the same CSI reporting instance/CSI report, the UE could also report K groups of beam metrics such as L1-RSRPs associated with the reported K groups of resource indicators respectively. Each of the K groups of beam metrics including two beam metrics, wherein a first beam metric in a first group of the K groups of beam metrics is a L1-RSRP, quantized to a 7-bit value in a range [−140, −44] dBm with a 1 dB step size, and remaining beam metrics in the K groups of beam metrics are L1-RSRPs, quantized to 4-bit values in the range [−140, −44] dBm with a 2 dB step size with a reference to the first beam metric in the first group of beam metrics.

Figure 11:
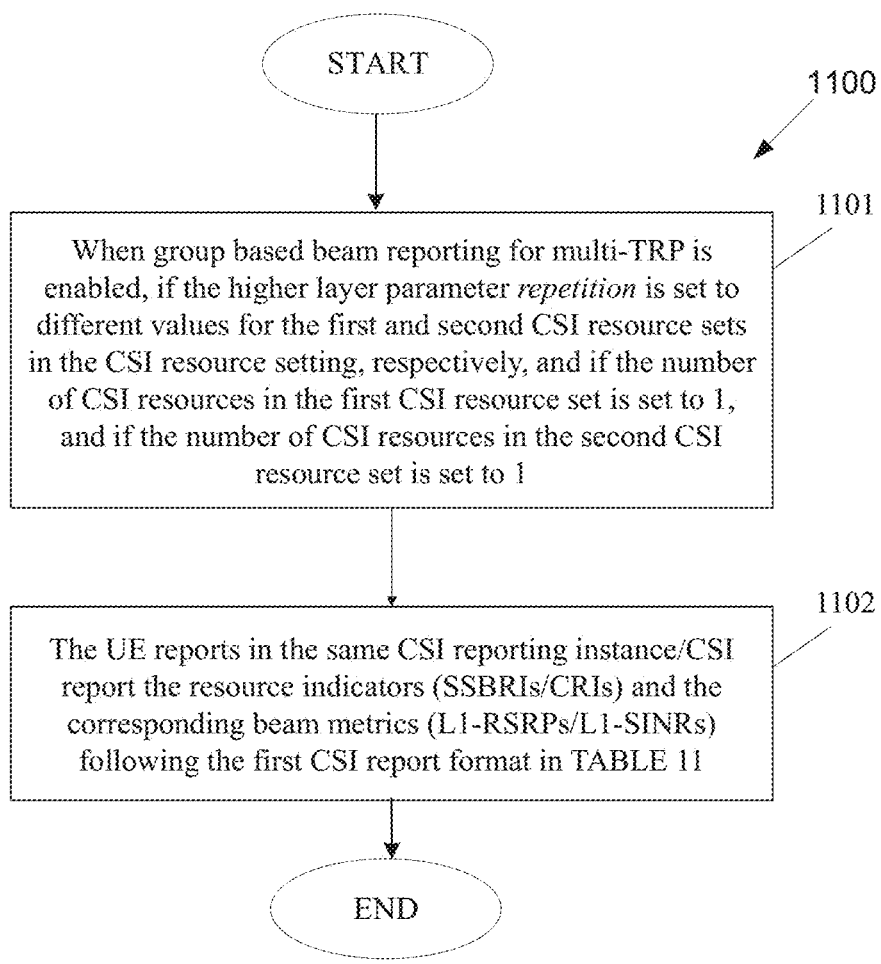
FIG. 11 illustrates yet another example of determining CSI report format according to embodiments of the present disclosure.

FIG. 11 illustrates yet another example of a process 1100 for determining a CSI report format according to embodiments of the present disclosure. For example, the process 1100 may be performed by a UE, such as UE 116 in FIG. 1, and/or a BS, such as BS 102 in FIG. 1. An embodiment of the process 1100 for determining the CSI report format shown in FIG. 11 is for illustration only.

In FIG. 11, a flowchart illustrating the above-described UE reporting behavior/procedure is presented.

In 1101, the higher layer parameter repetition is set to different values for the first and second CSI resource sets in the CSI resource setting, respectively (when the group-based beam reporting for multi-TRP, e.g., the higher layer parameter groupBasedBeamReporting-r17, is configured or is set to 'enabled'). Furthermore, the number of CSI resources in the first CSI resource set is set to 1, and the number of CSI resources in the second CSI resource set is set to 1.

In 1102, the UE could report in the same CSI reporting instance/CSI report the resource indicators such as SSBRIs/CRIs and the corresponding beam metrics such as L1-RSRPs/L1-SINRs following the first CSI report format given in TABLE 11.

The UE could determine a single spatial domain transmit filter or multiple spatial domain transmit filters to simultaneously transmit uplink channels/signals to the network. For this case, the UE could report to the network one or more resource indicators, to which the single spatial domain transmit filter or the multiple spatial domain transmit filters are spatially related.

For instance, when the simultaneous uplink transmission is configured/enabled, the UE could report in a single CSI reporting instance/CSI report G (e.g., G=1, 2, 4, 8, 16) groups of resource indicators such as SSBRIs/CRIs with each of the G groups of resource indicators including two resource indicators; the first resource indicator in each group of resource indicators is determined/selected from the first or second CSI resource set indicated by a resource set indicator (e.g., with '0' indicating the first CSI resource set and '1' indicating the second CSI resource set) reported in the same CSI reporting instance/CSI report, and the second resource indicator in each group of resource indicators is determined/selected from a different CSI resource set from that indicated by the resource set indicator.

Furthermore, in the same CSI reporting instance/CSI report, the UE could also report G groups of beam metrics such as L1-RSRPs associated with the reported G groups of resource indicators respectively. Each of the G groups of beam metrics including two beam metrics, wherein a first beam metric in a first group of the G groups of beam metrics is a L1-RSRP, quantized to a 7-bit value in a range [−140, −44] dBm with a 1 dB step size, and remaining beam metrics in the G groups of beam metrics are L1-RSRPs, quantized to 4-bit values in the range [−140, −44] dBm with a 2 dB step size with a reference to the first beam metric in the first group of beam metrics.

The UE could also report in the same CSI reporting instance/CSI report one or more (e.g., two) UE antenna panel IDs such as UE's capability set indexes. Each reported UE panel ID or capability set index could be associated with a resource indicator in each reported group of resource indicators.

Furthermore, in one example, the UE could assume a single spatial domain transmit filter that is spatially related to or quasi co-located with the two resource indicators in each reported group to simultaneously transmit the uplink channels/signals.

In another example, the UE could assume multiple spatial domain transmit filters that are spatially related to or quasi co-located with the two resource indicators in each reported group to simultaneously transmit the uplink channels/signals.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
   a transceiver configured to:
      receive a first configuration for a first set of reference signal (RS) resources configured in a channel state information (CSI) resource setting;
      receive a second configuration for a second set of RS resources configured in the CSI resource setting;
      receive a first set of RSs through the first set of RS resources; and
      receive a second set of RSs through the second set of RS resources; and
   a processor operably coupled to the transceiver, the processor configured to:
      measure at least one RS in the first or second sets of RSs;
      determine, based on the measured at least one RS, one or more resource indicators or one or more beam metrics; and
      determine, based on the first or second configurations, a first CSI report or a second CSI report;

wherein the transceiver is further configured to transmit, in the first or second CSI reports, the one or more resource indicators or the one or more beam metrics,
   wherein the first or second sets of RSs include synchronization signal blocks (SSBs) or non-zero power CSI-RSs (NZP CSI-RSs),
   wherein the one or more resource indicators include SSB resource indicators (SSBRIs) or CSI-RS resource indicators (CRIs), and
   wherein the one or more beam metrics include layer 1 RS received powers (L1-RSRPs) or layer 1 signal to interference plus noise ratios (L1-SINRs).

2. The UE of claim 1, wherein:
   the first CSI report comprises one or more of:
      a resource set indicator with a value '0' indicating the first set of RS resources and a value '1' indicating the second set of RS resources;
      a set of K resource indicators based on the first or second sets of RS resources; and
      a set of K beam metrics associated with the set of K resource indicators, where K=1, 2, 3 or 4,
   a first beam metric in the set of K beam metrics is a L1-RSRP, quantized to a 7-bit value in a range [−140, −44] dBm with a 1 dB step size, and
   remaining (K−1) beam metrics in the set of K beam metrics are L1-RSRPs, quantized to 4-bit values in the range [−140, −44] dBm with a 2 dB step size with a reference to the first beam metric.

3. The UE of claim 1, wherein:
   the second CSI report comprises one or more of:
      a resource set indicator with a value '0' indicating the first set of RS resources and a value '1' indicating the second set of RS resources;
      K groups of resource indicators with each of the K groups of resource indicators including two resource indicators, wherein a first resource indicator in each of the K groups of resource indicators is based on one of the first and second sets of RS resources indicated by the resource set indicator, and a second resource set indicator in each group is based on the other one of the first and second sets of RS resources; and
      K groups of beam metrics associated with the K groups of resource indicators with each of the K groups of beam metrics including two beam metrics, where K=1, 2, 3 or 4,
   a first beam metric in a first group of the K groups of beam metrics is a L1-RSRP, quantized to a 7-bit value in a range [−140, −44] dBm with a 1 dB step size, and
   remaining beam metrics in the K groups of beam metrics are L1-RSRPs, quantized to 4-bit values in the range [−140, −44] dBm with a 2 dB step size with a reference to the first beam metric in the first group of beam metrics.

4. The UE of claim 1, wherein:
   the first and second configurations comprise a higher layer parameter repetition for the first and second sets of RS resources, respectively,
   when the higher layer parameter repetition for one of the first and second sets of RS resources is set to 'on' and the higher layer parameter repetition for the other one of the first and second sets of RS resources is set to 'off', the transceiver is further configured to transmit the first CSI report,
   a resource set indicator indicates the other one of the first and second sets of RS resources with the higher layer parameter repetition set to 'off', and a set of K resource indicators are based on the other one of the first and second sets of RS resources with the higher layer parameter repetition set to 'off'.

5. The UE of claim 1, wherein:
the first and second configurations comprise a higher layer parameter repetition for the first and second sets of RS resources, respectively,
when the higher layer parameter repetition for the first set of RS resources is set to 'on', the higher layer parameter repetition for the second sets of RS resources is set to 'on',
when the higher layer parameter repetition for the first set of RS resources is set to 'off', the higher layer parameter repetition for the second sets of RS resources is set to 'off',
when the higher layer parameter repetition for one of the first and second sets of RS resources is set to 'on' and the higher layer parameter repetition for the other one of the first and second sets of RS resources is set to 'off', a number of RS resources in the first set of RS resources is one and a number of RS resources in the second set of RS resources is one, and
the transceiver is further configured to transmit the second CSI report.

6. The UE of claim 1, wherein:
the transceiver is further configured to receive an indication for simultaneous uplink transmission;
the processor is further configured to determine, based on the indication:
a resource set indicator with a value '0' indicating the first set of RS resources and a value '1' indicating the second set of RS resources, and
G groups of resource indicators with each of the G groups of resource indicators including two resource indicators, wherein a first resource indicator in each of the G groups of resource indicators is based on one of the first and second sets of RS resources indicated by the resource set indicator and a second resource set indicator in each of the G groups of resource indicators is based on the other one of the first and second sets of RS resources, where G=1, 2, 3 or 4, and
the indication corresponds to at least one of:
using a single spatial domain transmit filter that is spatially related to or quasi co-located with two resource indicators in a group to transmit uplink channels or signals; and
using multiple simultaneous spatial domain transmit filters that are spatially related to or quasi co-located with two resource indicators respectively in a group to transmit uplink channels or signals.

7. The UE of claim 1, wherein:
the transceiver is further configured to:
receive an indication for simultaneous uplink transmission; and
transmit, in a CSI reporting instance:
a resource set indicator;
one or more UE panel identities (IDs) or one or more UE capability set indexes;
G groups of resource indicators; and
G groups of beam metrics associated with the G groups of resource indicators with each of the G groups of beam metrics including two beam metrics,
a first beam metric in a first group of the G groups of beam metrics is a L1-RSRP, quantized to a 7-bit value in a range [−140, −44] dBm with a 1 dB step size, and remaining beam metrics in the G groups of beam metrics are L1-RSRPs, quantized to 4-bit values in the range [−140, −44] dBm with a 2 dB step size with a reference to the first beam metric in the first group of beam metrics.

8. A base station (BS), comprising:
a transceiver configured to:
transmit a first configuration for a first set of reference signal (RS) resources configured in a channel state information (CSI) resource setting;
transmit a second configuration for a second set of RS resources configured in the CSI resource setting;
transmit a first set of RSs through the first set of RS resources;
transmit a second set of RSs through the second set of RS resources; and
receive, in a first CSI report or a second CSI report, one or more resource indicators or one or more beam metrics corresponding to at least one RS in the first or second sets of RSs based on the first or second configurations,
wherein the first or second sets of RSs include synchronization signal blocks (SSBs) or non-zero power CSI-RSs (NZP CSI-RSs),
wherein the one or more resource indicators include SSB resource indicators (SSBRIs) or CSI-RS resource indicators (CRIs), and
wherein the one or more beam metrics include layer 1 RS received powers (L1-RSRPs) or layer 1 signal to interference plus noise ratios (L1-SINRs).

9. The BS of claim 8, wherein:
the first CSI report comprises one or more of:
a resource set indicator with a value '0' indicating the first set of RS resources and a value '1' indicating the second set of RS resources;
a set of K resource indicators corresponding to the first or second sets of RS resources; and
a set of K beam metrics associated with the set of K resource indicators, where K=1, 2, 3 or 4,
a first beam metric in the set of K beam metrics is a L1-RSRP, quantized to a 7-bit value in a range [−140, −44] dBm with a 1 dB step size, and
remaining (K−1) beam metrics in the set of K beam metrics are L1-RSRPs, quantized to 4-bit values in the range [−140, −44] dBm with a 2 dB step size with a reference to the first beam metric.

10. The BS of claim 8, wherein:
the second CSI report comprises one or more of:
a resource set indicator with a value '0' indicating the first set of RS resources and a value '1' indicating the second set of RS resources;
K groups of resource indicators with each of the K groups of resource indicators including two resource indicators, wherein a first resource indicator in each of the K groups of resource indicators corresponds to one of the first and second sets of RS resources indicated by the resource set indicator, and a second resource set indicator in each group corresponds to the other one of the first and second sets of RS resources; and
K groups of beam metrics associated with the K groups of resource indicators with each of the K groups of beam metrics including two beam metrics, where K=1, 2, 3 or 4,
a first beam metric in a first group of the K groups of beam metrics is a L1-RSRP, quantized to a 7-bit value in a range [−140, −44] dBm with a 1 dB step size, and remaining beam metrics in the K groups of beam metrics are L1-RSRPs, quantized to 4-bit values in the range [−140, −44] dBm with a 2 dB step size with a reference to the first beam metric in the first group of beam metrics.

11. The BS of claim 8, wherein:
the first and second configurations comprise a higher layer parameter repetition for the first and second sets of RS resources, respectively,
when the higher layer parameter repetition for one of the first and second sets of RS resources is set to 'on' and the higher layer parameter repetition for the other one of the first and second sets of RS resources is set to 'off', the transceiver is further configured to receive the first CSI report,
a resource set indicator indicates the other one of the first and second sets of RS resources with the higher layer parameter repetition set to 'off', and
a set of K resource indicators correspond to the other one of the first and second sets of RS resources with the higher layer parameter repetition set to 'off'.

12. The BS of claim 8, wherein:
the first and second configurations comprise a higher layer parameter repetition for the first and second sets of RS resources, respectively,
when the higher layer parameter repetition for the first set of RS resources is set to 'on', the higher layer parameter repetition for the second sets of RS resources is set to 'on',
when the higher layer parameter repetition for the first set of RS resources is set to 'off', the higher layer parameter repetition for the second sets of RS resources is set to 'off',
when the higher layer parameter repetition for one of the first and second sets of RS resources is set to 'on' and the higher layer parameter repetition for the other one of the first and second sets of RS resources is set to 'off', a number of RS resources in the first set of RS resources is one and a number of RS resources in the second set of RS resources is one, and
the transceiver is further configured to receive the second CSI report.

13. The BS of claim 8, wherein:
the transceiver is further configured to:
 transmit an indication for simultaneous uplink transmission; and
 receive, in a CSI reporting instance:
  a resource set indicator;
  one or more UE panel identities (IDs) or one or more UE capability set indexes;
  G groups of resource indicators; and
  G groups of beam metrics associated with the G groups of resource indicators with each of the G groups of beam metrics including two beam metrics,
a first beam metric in a first group of the G groups of beam metrics is a L1-RSRP, quantized to a 7-bit value in a range [−140, −44] dBm with a 1 dB step size, and
remaining beam metrics in the G groups of beam metrics are L1-RSRPs, quantized to 4-bit values in the range [−140, −44] dBm with a 2 dB step size with a reference to the first beam metric in the first group of beam metrics.

14. A method for operating a user equipment (UE), the method comprising:
receiving a first configuration for a first set of reference signal (RS) resources configured in a channel state information (CSI) resource setting;
receiving a second configuration for a second set of RS resources configured in the CSI resource setting;
receiving a first set of RSs through the first set of RS resources;
receiving a second set of RSs through the second set of RS resources;
measuring at least one RS in the first or second sets of RSs;
determining, based on the measured at least one RS, one or more resource indicators or one or more beam metrics;
determining, based on the first or second configurations, a first CSI report or a second CSI report; and
transmitting, in the first or second CSI reports, the one or more resource indicators or the one or more beam metrics,
wherein the first or second sets of RSs include synchronization signal blocks (SSBs) or non-zero power CSI-RSs (NZP CSI-RSs),
wherein the one or more resource indicators include SSB resource indicators (SSBRIs) or CSI-RS resource indicators (CRIs), and
wherein the one or more beam metrics include layer 1 RS received powers (L1-RSRPs) or layer 1 signal to interference plus noise ratios (L1-SINRs).

15. The method of claim 14, wherein:
the first CSI report comprises one or more of:
 a resource set indicator with a value '0' indicating the first set of RS resources and a value '1' indicating the second set of RS resources;
 a set of K resource indicators based on the first or second sets of RS resources; and
 a set of K beam metrics associated with the set of K resource indicators, where K=1, 2, 3 or 4,
a first beam metric in the set of K beam metrics is a L1-RSRP, quantized to a 7-bit value in a range [−140, −44] dBm with a 1 dB step size, and
remaining (K−1) beam metrics in the set of K beam metrics are L1-RSRPs, quantized to 4-bit values in the range [−140, −44] dBm with a 2 dB step size with a reference to the first beam metric.

16. The method of claim 14, wherein:
the second CSI report comprises one or more of:
 a resource set indicator with a value '0' indicating the first set of RS resources and a value '1' indicating the second set of RS resources;
 K groups of resource indicators with each of the K groups of resource indicators including two resource indicators, wherein a first resource indicator in each of the K groups of resource indicators is based on one of the first and second sets of RS resources indicated by the resource set indicator, and a second resource set indicator in each group is based on the other one of the first and second sets of RS resources; and
 K groups of beam metrics associated with the K groups of resource indicators with each of the K groups of beam metrics including two beam metrics, where K=1, 2, 3 or 4,
a first beam metric in a first group of the K groups of beam metrics is a L1-RSRP, quantized to a 7-bit value in a range [−140, −44] dBm with a 1 dB step size, and
remaining beam metrics in the K groups of beam metrics are L1-RSRPs, quantized to 4-bit values in the range

[−140, −44] dBm with a 2 dB step size with a reference to the first beam metric in the first group of beam metrics.

17. The method of claim 14, wherein:
the first and second configurations comprise a higher layer parameter repetition for the first and second sets of RS resources, respectively,
when the higher layer parameter repetition for one of the first and second sets of RS resources is set to 'on', and the higher layer parameter repetition for the other one of the first and second sets of RS resources is set to 'off', transmitting, in the first or second CSI reports, the one or more resource indicators or the one or more beam metrics comprises transmitting the first CSI report,
a resource set indicator indicates the other one of the first and second sets of RS resources with the higher layer parameter repetition set to 'off', and
a set of K resource indicators are based on the other one of the first and second sets of RS resources with the higher layer parameter repetition set to 'off'.

18. The method of claim 14, wherein:
the first and second configurations comprise a higher layer parameter repetition for the first and second sets of RS resources, respectively,
when the higher layer parameter repetition for the first set of RS resources is set to 'on', the higher layer parameter repetition for the second sets of RS resources is set to 'on',
when the higher layer parameter repetition for the first set of RS resources is set to 'off', the higher layer parameter repetition for the second sets of RS resources is set to 'off',
when the higher layer parameter repetition for one of the first and second sets of RS resources is set to 'on' and the higher layer parameter repetition for the other one of the first and second sets of RS resources is set to 'off', a number of RS resources in the first set of RS resources is one and a number of RS resources in the second set of RS resources is one, and
transmitting, in the first or second CSI reports, the one or more resource indicators or the one or more beam metrics comprises transmitting the second CSI report.

19. The method of claim 14, further comprising:
receiving an indication for simultaneous uplink transmission; and
determining, based on the indication:
a resource set indicator with a value '0' indicating the first set of RS resources and a value '1' indicating the second set of RS resources, and
G groups of resource indicators with each of the G groups of resource indicators including two resource indicators, wherein a first resource indicator in each of the G groups of resource indicators is based on one of the first and second sets of RS resources indicated by the resource set indicator and a second resource set indicator in each of the G groups of resource indicators is based on the other one of the first and second sets of RS resources, where G=1, 2, 3 or 4, and
wherein the indication corresponds to at least one of:
using a single spatial domain transmit filter that is spatially related to or quasi co-located with two resource indicators in a group to transmit uplink channels or signals; and
using multiple simultaneous spatial domain transmit filters that are spatially related to or quasi co-located with two resource indicators respectively in a group to transmit uplink channels or signals.

20. The method of claim 14, further comprising:
receiving an indication for simultaneous uplink transmission; and
transmitting, in a CSI reporting instance:
a resource set indicator;
one or more UE panel identities (IDs) or one or more UE capability set indexes;
G groups of resource indicators; and
G groups of beam metrics associated with the G groups of resource indicators with each of the G groups of beam metrics including two beam metrics,
wherein a first beam metric in a first group of the G groups of beam metrics is a L1-RSRP, quantized to a 7-bit value in a range [−140, −44] dBm with a 1 dB step size, and
wherein remaining beam metrics in the G groups of beam metrics are L1-RSRPs, quantized to 4-bit values in the range [−140, −44] dBm with a 2 dB step size with a reference to the first beam metric in the first group of beam metrics.

* * * * *